(12) United States Patent
Toner

(10) Patent No.: US 9,677,728 B2
(45) Date of Patent: Jun. 13, 2017

(54) FLAGPOLE ILLUMINATION DEVICE

(71) Applicant: Gary L. Toner, Derby, NY (US)

(72) Inventor: Gary L. Toner, Derby, NY (US)

( * ) Notice: Subject to any disclaimer, the term of this patent is extended or adjusted under 35 U.S.C. 154(b) by 419 days.

(21) Appl. No.: 14/199,135

(22) Filed: Mar. 6, 2014

(65) Prior Publication Data
US 2014/0211459 A1    Jul. 31, 2014

Related U.S. Application Data

(63) Continuation-in-part of application No. 13/940,878, filed on Jul. 12, 2013, now Pat. No. 9,523,484.
(Continued)

(51) Int. Cl.
| | |
|---|---|
| *F21S 8/00* | (2006.01) |
| *F21S 9/03* | (2006.01) |
| *E04H 12/32* | (2006.01) |
| *F21V 33/00* | (2006.01) |
| *F21V 21/116* | (2006.01) |
| *F21V 21/088* | (2006.01) |

(Continued)

(52) U.S. Cl.
CPC ............. *F21S 9/035* (2013.01); *E04H 12/32* (2013.01); *F21S 9/032* (2013.01); *F21V 21/116* (2013.01); *F21V 33/00* (2013.01); *G09F 17/00* (2013.01); *F21S 8/03* (2013.01); *F21S 8/032* (2013.01); *F21S 8/033* (2013.01); *F21S 8/08* (2013.01); *F21S 9/037* (2013.01); *F21V 17/02* (2013.01); *F21V 21/088* (2013.01); *F21V 21/0824* (2013.01); *F21V 21/30* (2013.01); *F21W 2131/10* (2013.01); *F21W 2131/103* (2013.01); *F21Y 2115/10* (2016.08); *Y02B 10/10* (2013.01)

(58) Field of Classification Search
CPC .. F21S 9/032; F21S 9/035; F21S 8/065; F21S 8/085; F21S 8/086; F21V 21/26; F21V 21/116; F21V 21/14; F21V 21/108; F21V 21/088; Y10T 403/32098; Y10T 403/32106; Y10T 403/32254
USPC ................... 362/426, 371, 431–432; 403/64; 248/292.12, 276.1, 281.11, 284.1
See application file for complete search history.

(56) References Cited

U.S. PATENT DOCUMENTS

| | | | | |
|---|---|---|---|---|
| 6,585,400 B2 * | 7/2003 | Leen | ...................... | F21L 14/02 |
| | | | | 362/371 |
| 7,523,904 B2 * | 4/2009 | Carnevali | ............... | F16C 11/10 |
| | | | | 248/176.1 |
| 8,317,152 B1 * | 11/2012 | Zhou | .................... | F16M 11/041 |
| | | | | 248/122.1 |
| RE43,921 E * | 1/2013 | Smed | .................... | F16M 11/04 |
| | | | | 248/124.1 |

(Continued)

*Primary Examiner* — Peggy Neils
*Assistant Examiner* — William N Harris
(74) *Attorney, Agent, or Firm* — Del Vecchio and Stadler LLP

(57) ABSTRACT

An illumination device having a pole mount, a light support that extends from the pole mount, a lighting unit is connected to the pole mount, and a solar panel assembly is mounted to the lighting unit. In another embodiment an illumination apparatus is provided having a pole mount and a lighting assembly, and the pole mount has hinged first clamp half and second clamp halves. When in the closed clamp position the pole mount clamp defines a pole opening. A first light support extends from the first clamp half and a light emitting assembly is supported by the first light support. In another preferred embodiment there is a band illumination device that is secured to a pole with a band, and in another preferred embodiment there is and adjustable band illumination assembly secured to a pole with bands.

9 Claims, 34 Drawing Sheets

Related U.S. Application Data

Figure 1:
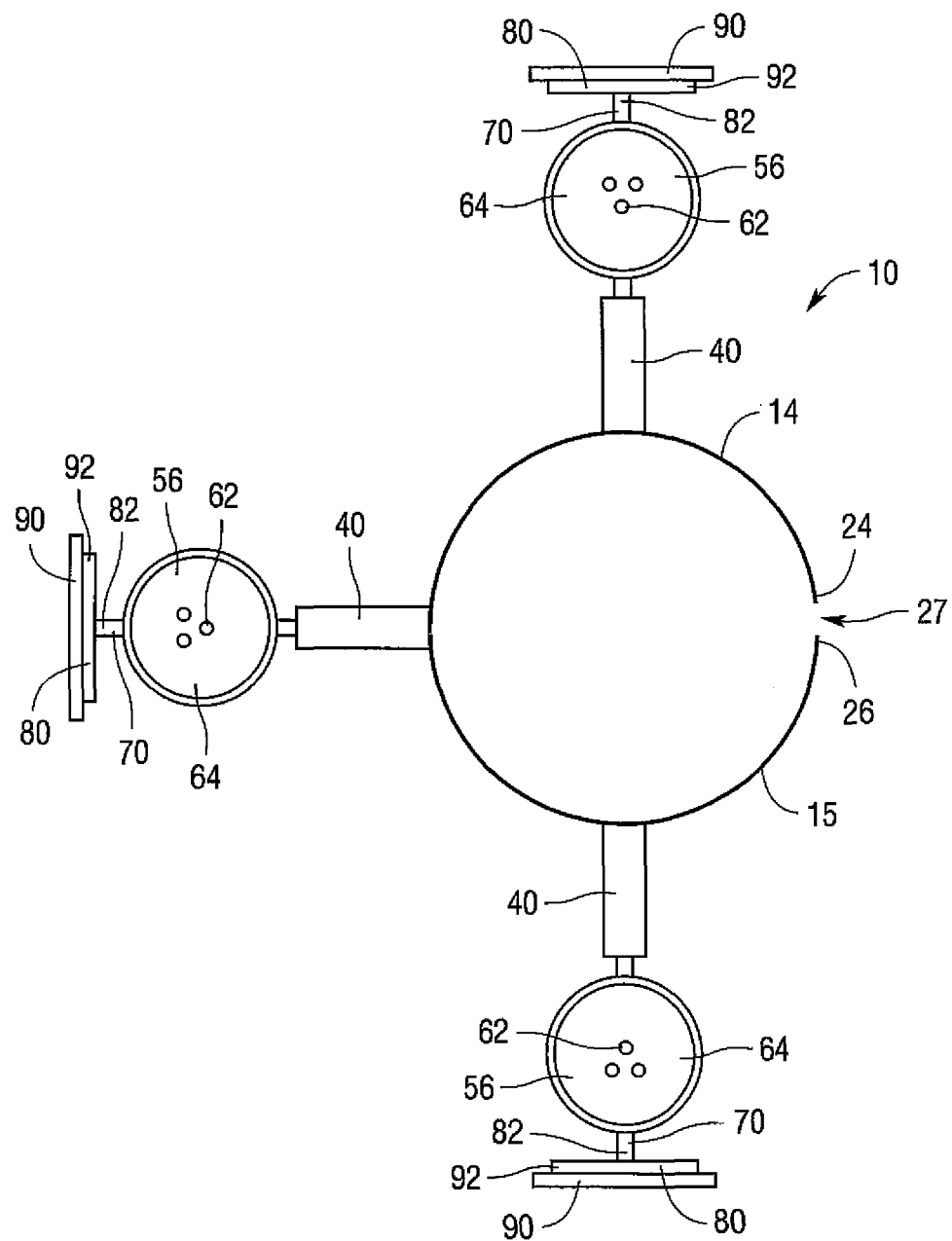

(60) Provisional application No. 61/710,044, filed on Oct. 5, 2012, provisional application No. 61/671,154, filed on Jul. 13, 2012.

(51) Int. Cl.
| | |
|---|---|
| *F21S 8/08* | (2006.01) |
| *F21V 17/02* | (2006.01) |
| *F21V 21/08* | (2006.01) |
| *F21V 21/30* | (2006.01) |
| *F21W 131/10* | (2006.01) |
| *G09F 17/00* | (2006.01) |
| *F21W 131/103* | (2006.01) |
| *F21Y 115/10* | (2016.01) |

(56) References Cited

U.S. PATENT DOCUMENTS

| | | | |
|---|---|---|---|
| 8,726,814 B1* | 5/2014 | Matteo | A47B 9/16 108/116 |
| 2005/0121578 A1* | 6/2005 | Asamarai | F16C 11/10 248/284.1 |
| 2007/0235607 A1* | 10/2007 | Liaw | F16M 13/02 248/218.4 |
| 2008/0247155 A1 | 10/2008 | Allsop et al. | |
| 2010/0102185 A1 | 4/2010 | Jenestreet | |
| 2010/0219762 A1* | 9/2010 | Brumels | F21S 8/086 315/158 |
| 2010/0302765 A1 | 12/2010 | Yu et al. | |
| 2012/0025037 A1* | 2/2012 | Chang | F16M 11/2014 248/124.1 |
| 2014/0085909 A1 | 3/2014 | Ahn | |

* cited by examiner

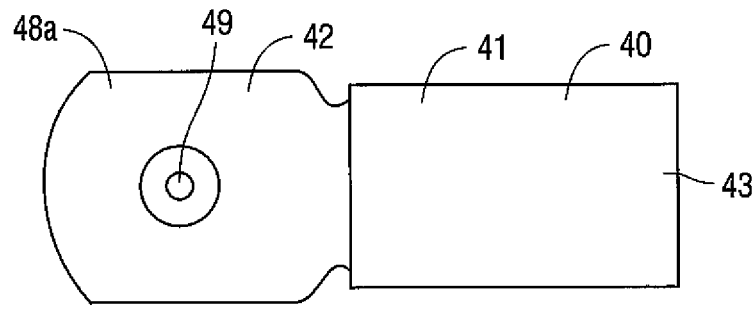
*Fig.3*
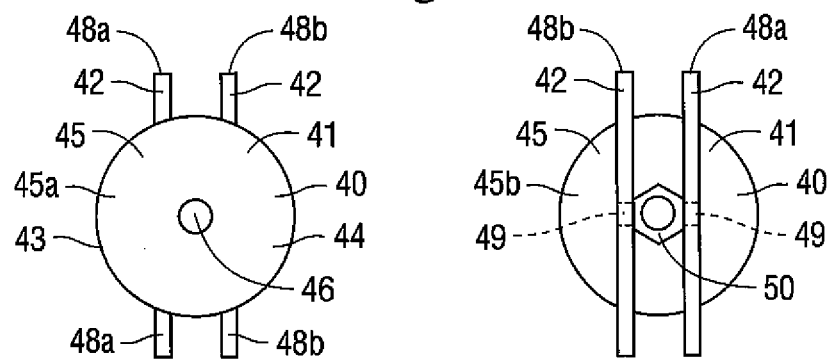
*Fig.3A*  *Fig.3B*
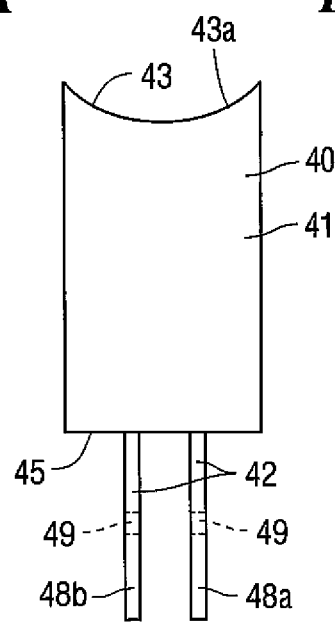
*Fig.3C*

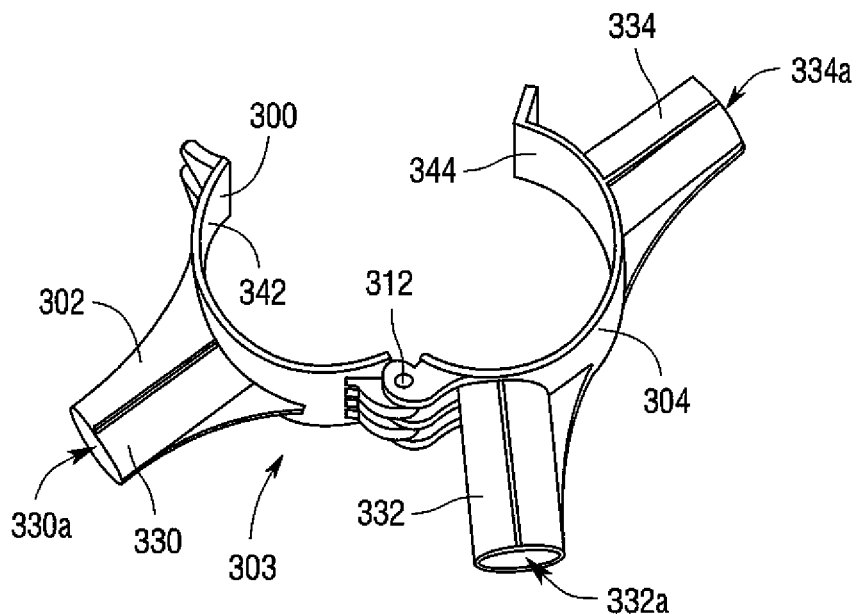
*Fig.14*
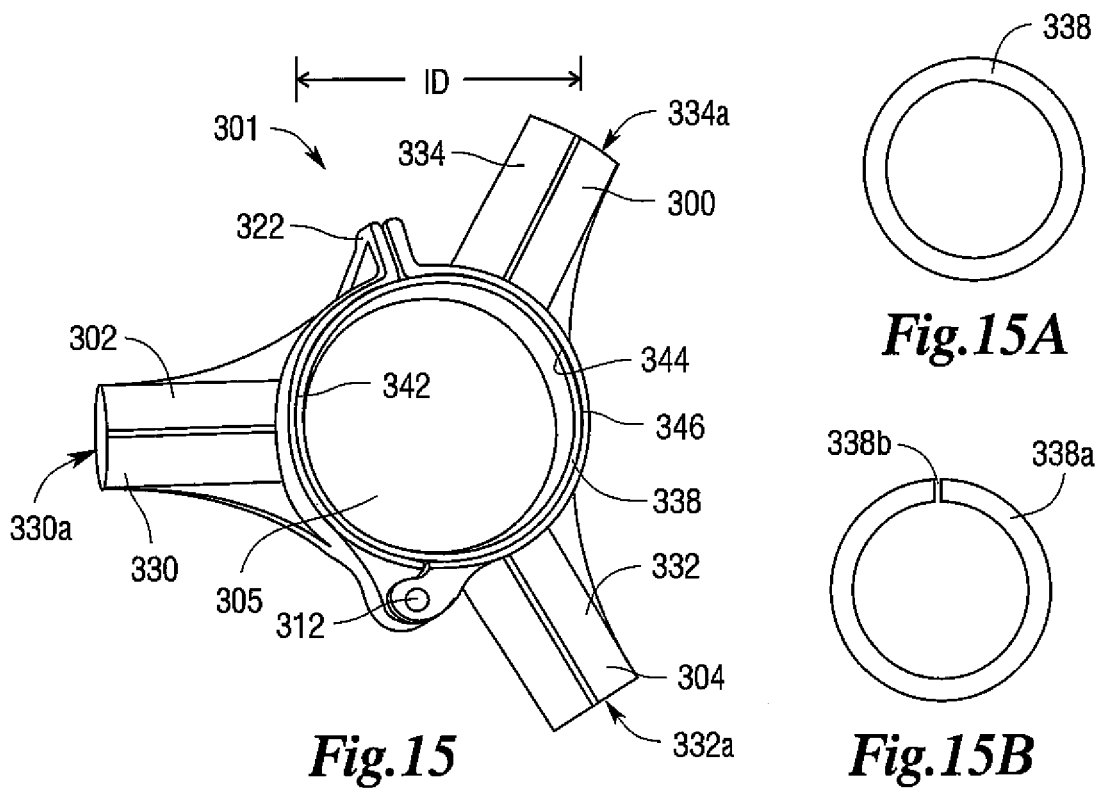
*Fig.15*
*Fig.15A*
*Fig.15B*

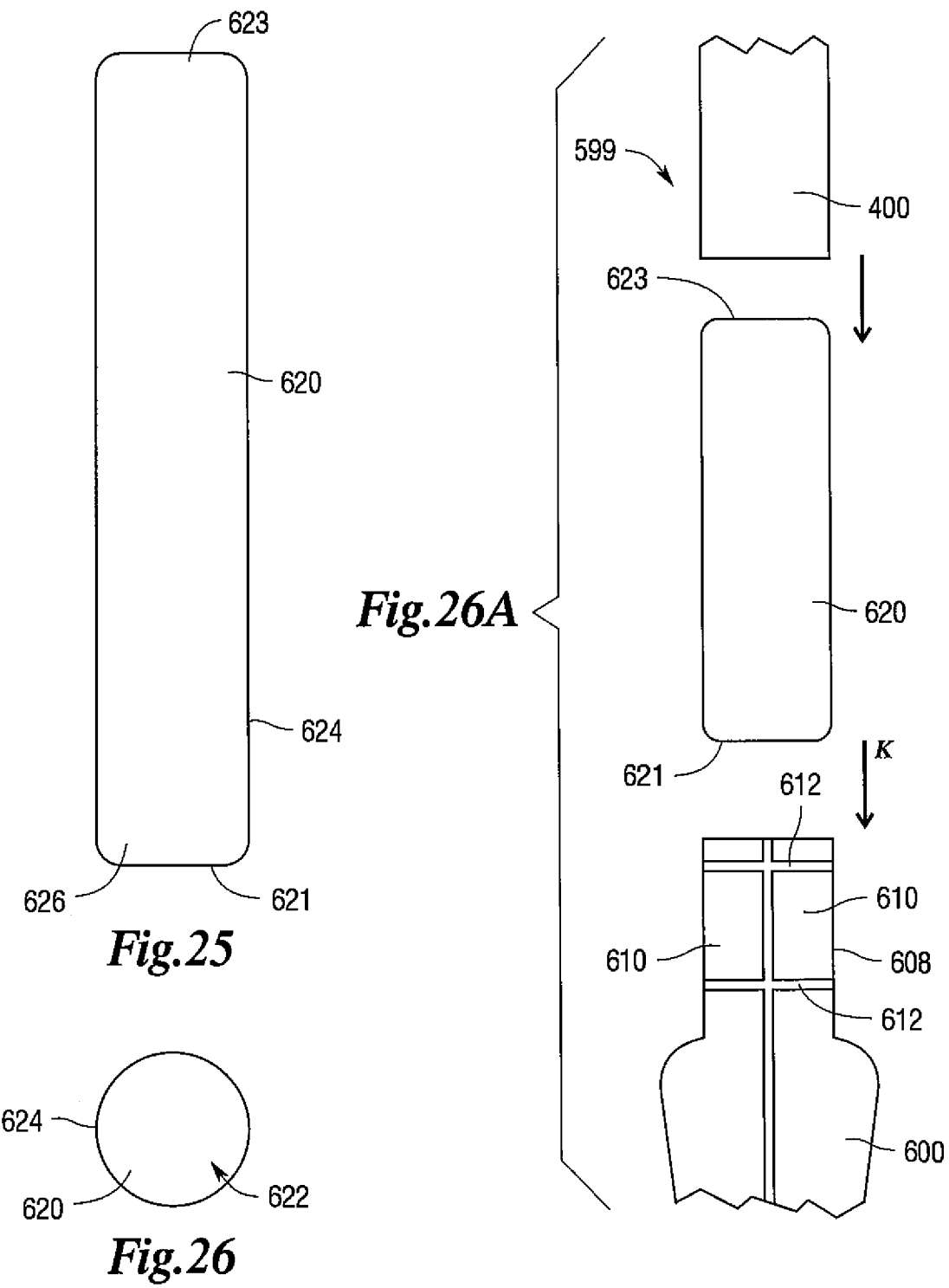

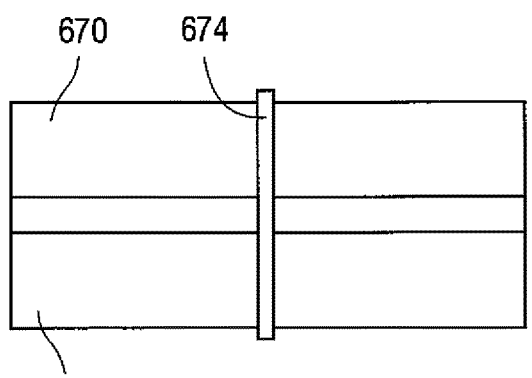
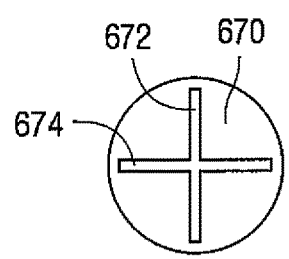
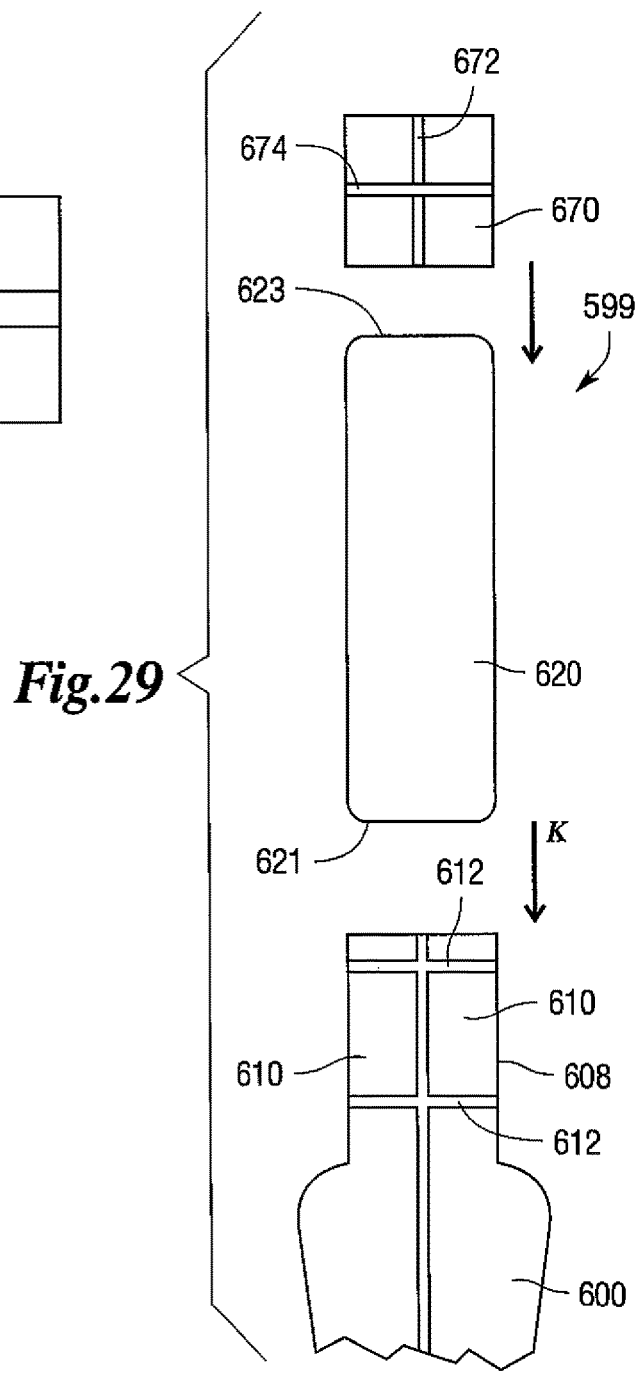

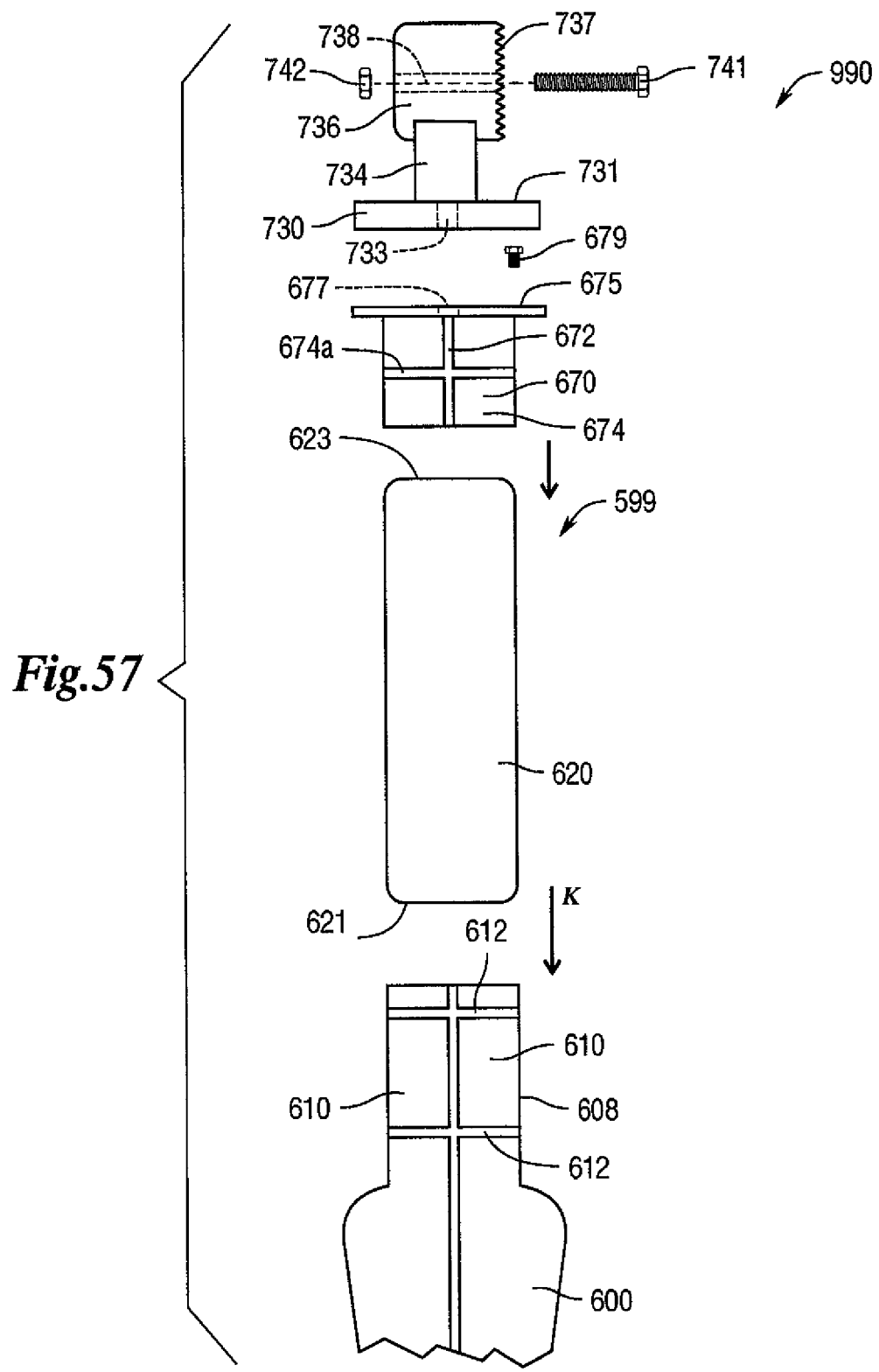

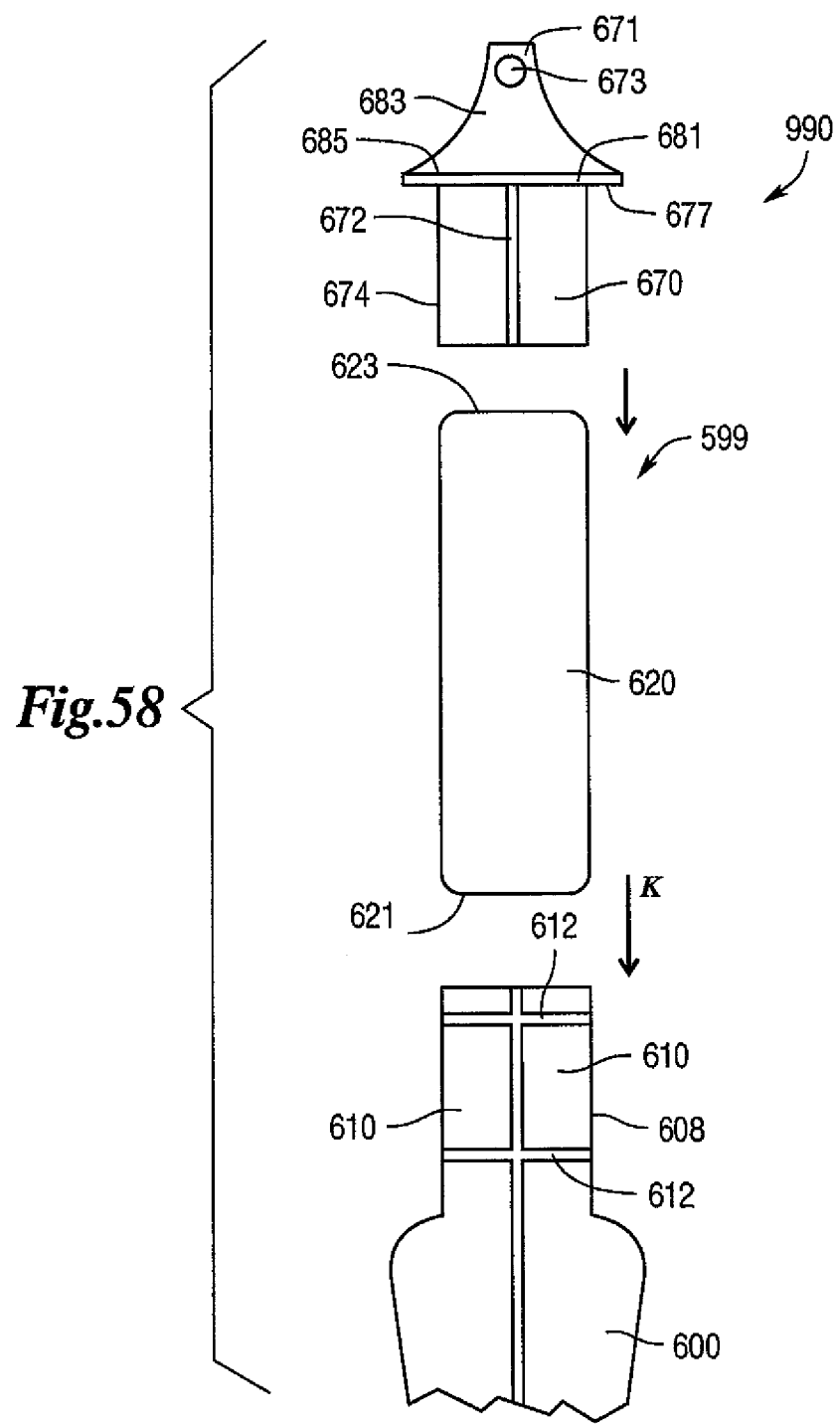

US 9,677,728 B2

FLAGPOLE ILLUMINATION DEVICE

CROSS REFERENCE TO RELATED APPLICATIONS

This application is a continuation in part of U.S. patent application Ser. No. 13/940,878 filed on Jul. 12, 2013 and this application claims the benefit of U.S. Provisional Patent Application 61/710,044 filed on Oct. 5, 2012 and claims the benefit of U.S. Provisional Patent Application 61/671,154 filed on Jul. 13, 2012 and the contents and disclosures of each are hereby incorporated herein by reference.

BACKGROUND

Many houses, businesses and governmental offices display the American flag. Oftentimes it is desirable to fly the flag during the nighttime hours. Of course, flag etiquette demands that when the American flag is flown during the nighttime hours it is to be properly illuminated. Presently, nighttime illumination of the flag is accomplished by mounting lights on the ground or nearby structures or buildings. One of the problems with keeping with proper flag etiquette is that the lights must be on during the entire night and this is expensive because of the amount of electrical power consumed. Indeed, some flag illumination systems are for only a limited amount of time and actually are turned off during a portion of the night to conserve on power costs.

In addition, homeowners and businesses have a need to provide lighting on their grounds, but do not want to expend the time and funds to have professionals, for example electricians, install the lighting, wiring and lighting fixtures.

Thus, there is a need for lighting device that is inexpensive and reliable, and capable of being installed by the homeowner or business, such that grounds (backyards, parking lots, buildings) or the American flag can be illuminated at nighttime.

SUMMARY

An illumination device is provided having a pole mount with a light support extending from the pole mount and a lighting unit is connected to the pole mount. A solar panel assembly is mounted to the lighting unit wherein the pole mount is adapted to be fitted to poles having different diameters. The lighting unit is rotatable relative to the light support and pole mount, and the solar panel assembly is rotatable relative to the lighting unit.

In another preferred embodiment an illumination apparatus having a pole mount clamp and a lighting assembly is provided. The pole mount clamp has a first clamp half and a second clamp half. A hinge joins the first half and the second clamp half together, and the first clamp half and the second clamp half are movable toward and away from one another to an open clamp position and to a closed clamp position. When in the closed clamp position the pole mount clamp defines a pole opening. A first light support extends from the first clamp half, and second and a third light supports extend from the second clamp half. A light emitting assembly is supported by each of the first, second and third light supports. The light emitting assembly includes a solar panel and a rechargeable battery pack and includes a light emitting diode component having at least one light emitting diode, and the light emitting diode component is capable of being powered by the rechargeable battery pack.

In another preferred embodiment there is a supported illumination device wherein an arm mount is provided that is capable of supporting the lighting assembly from a flat surface, for example a wall, a tree or a floor of a building.

In another preferred embodiment a spike supported illumination device having a ground spike and the ground spike has a spike insertion portion and an opposed spike portion. An extension member is provided and is adapted to receive the spike insertion portion and an arm insertion portion of the lighting assembly such that the light emitting assembly is elevated with respect to the surround ground. For even more elevation of the lighting assembly the extension members are used with connector members that hold the extension members together. The connector members and extension members can also be used in connection with the lighting assembly and the pole mount clamp such that the lighting assembly is spaced a distance away from the pole mount. This provides the user with the option of support the lighting assembly a distance away from the pole such to provide different types of lighting arrangements.

In another preferred embodiment there is a band illumination device comprising a clamp assembly that includes at least one screw band clamp having at least one band, a pole-engagement component having a base wall from which extend first and second contact walls and wherein the first contact wall defines at least one first contact wall opening and the second contact wall defines at least one second contact wall opening. The band extends through the at least one first contact wall opening and the at least one second contact wall opening. There is a pole engagement mount having a pole engagement base plate and a pole engagement mount arm that extends from the pole engagement base plate. The pole engagement base plate is connected to the base wall of the pole engagement component, and the pole engagement mount arm has a toothed mount arm portion having mount arm teeth and that defines a pole engagement mount arm opening.

A branched support member is provided. The branched support member has a central portion from which extend a first branch, a second branch and a third branch and wherein the first branch has a first branch distal end having a first branch engagement head that defines first branch engagement head opening and having first engagement head teeth that are meshed with the mount arm teeth. The first branch engagement head is connected to the to the toothed mount arm portion with a mount arm bolt that extends through the through the pole engagement mount arm opening and the first branch engagement head opening, such that the branched support member can be adjusted relative to the pole engagement mount arm prior to tightening a mount arm nut on the mount arm bolt.

In another preferred embodiment there is an adjustable band illumination assembly comprising first and second clamp assemblies, a first pole engagement mount having mount arm teeth is joined to the first clamp assembly, and a second identical pole engagement mount having mount arm teeth joined to the second clamp assembly. A light arm component having a first light arm end with a toothed light arm portion having light arm teeth is provided, and the light arm teeth mesh with the mount arm teeth of the first pole engagement mount when the light arm component is joined to the first pole engagement mount. The light arm component has a second light arm end having a connecting portion that defines a connecting opening. A clamped lighting assembly having first and second lighting assembly lugs that define first and second lighting assembly lug openings is provided. A lighting fastener extends though the connecting portion opening and the first and second lighting assembly lug openings to join the clamped lighting assembly and the light arm component.

A solar arm component having a first solar arm end with a toothed solar arm portion with solar arm teeth is provided, and the solar arm teeth mesh with the mount arm teeth of the second pole engagement mount when solar arm component is joined to the second pole engagement mount. The solar arm component has a second light arm end that has a solar arm engagement portion with solar arm engagement teeth. A solar panel unit having a solar panel assembly that includes a solar panel engagement head with solar panel engagement head teeth is provided, and the solar panel engagement head teeth mesh with the solar arm engagement teeth of the solar arm engagement portion when the solar panel engagement head is joined to the solar arm component.

In another preferred embodiment a spike illumination assembly provided that includes ground spikes that are used to elevate the solar panel unit and the clamped lighting assembly above the ground.

BRIEF DESCRIPTION OF THE DRAWING FIGURES

Figure 2:
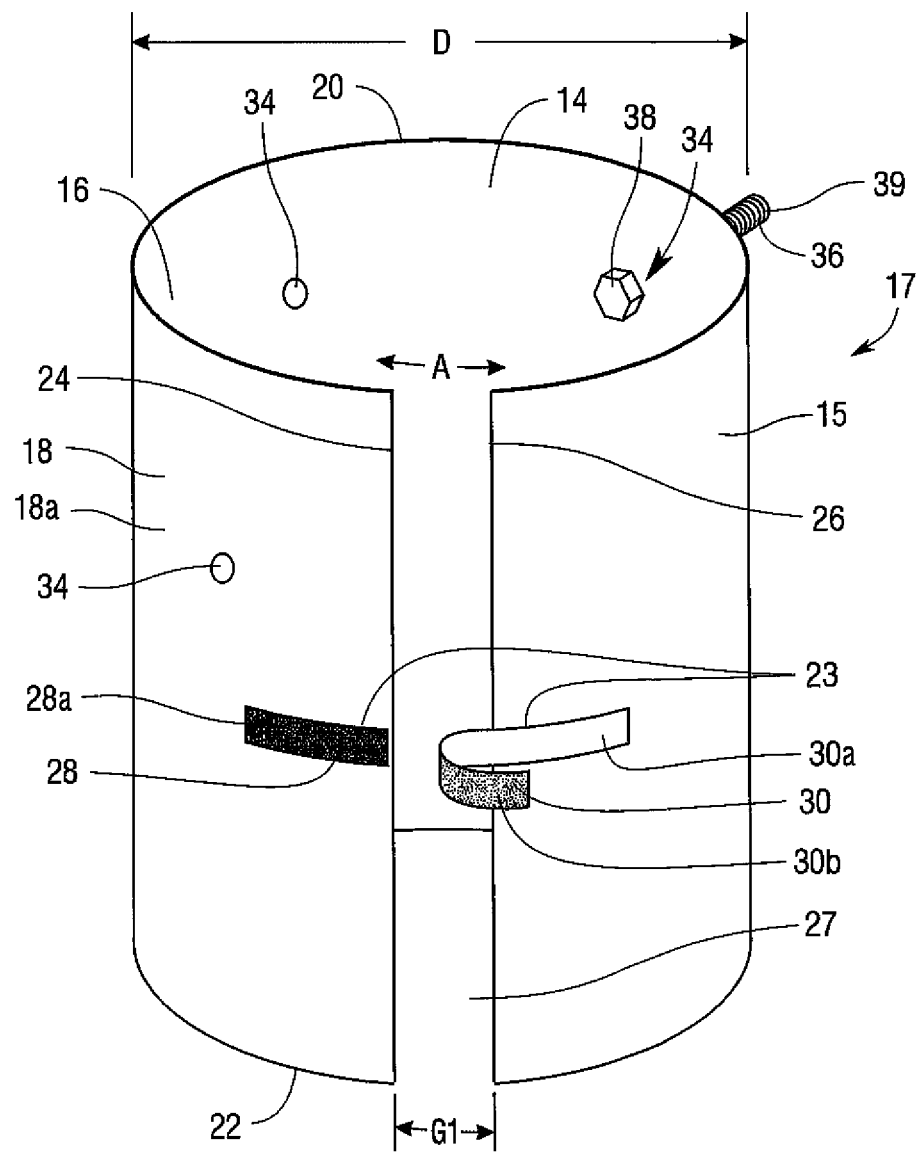
Figure 2A:
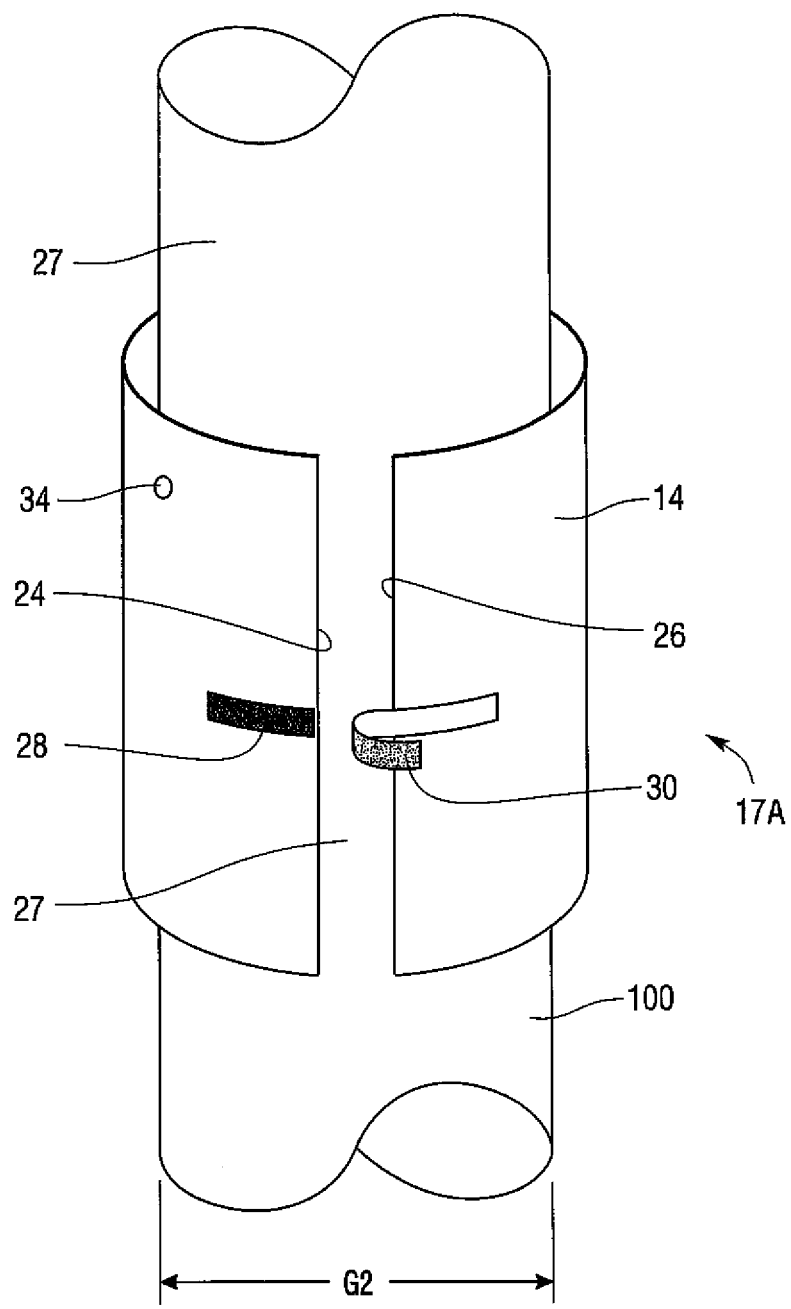
Figure 2B:
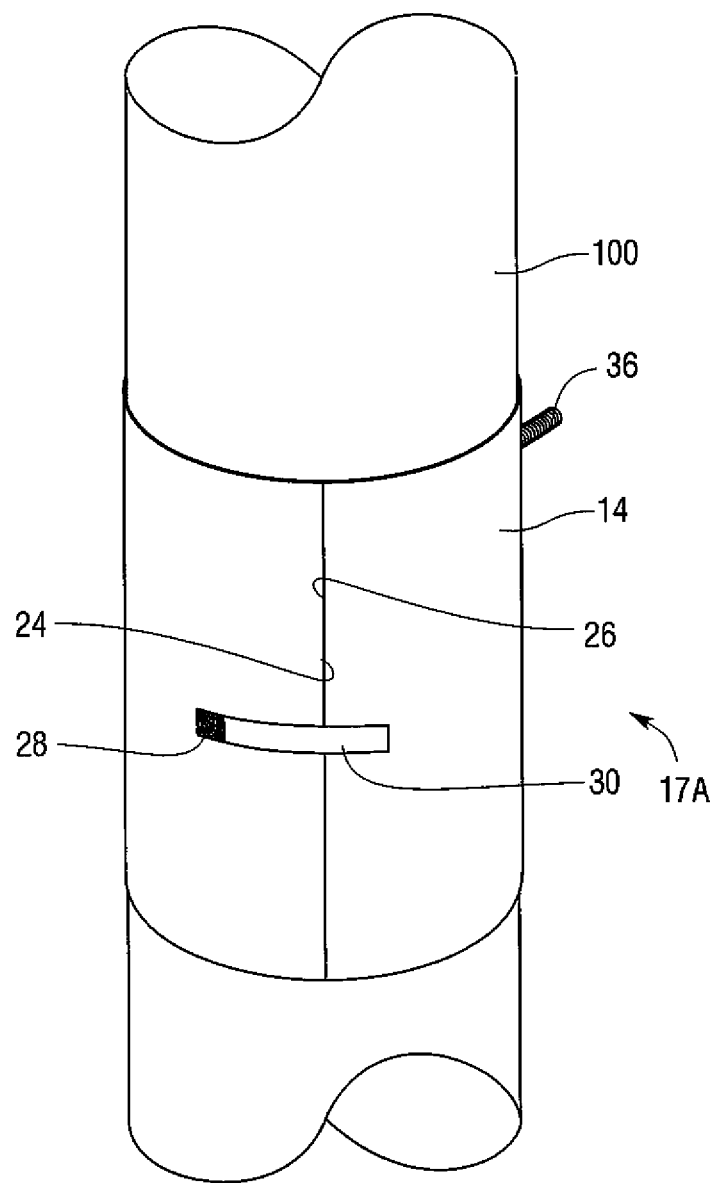
Figure 4:
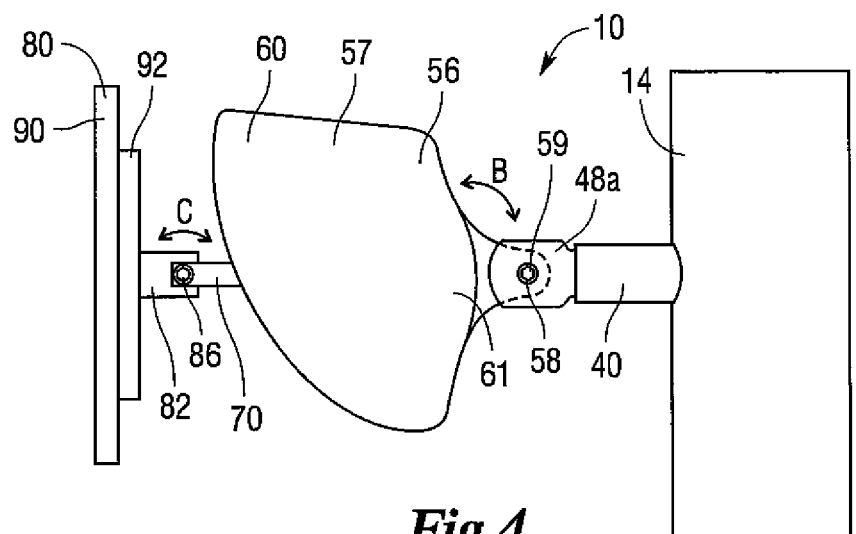
Figure 5:
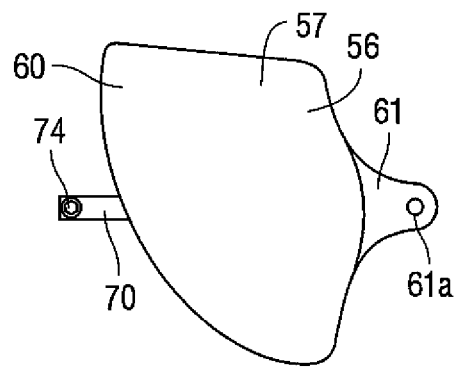
Figure 6:
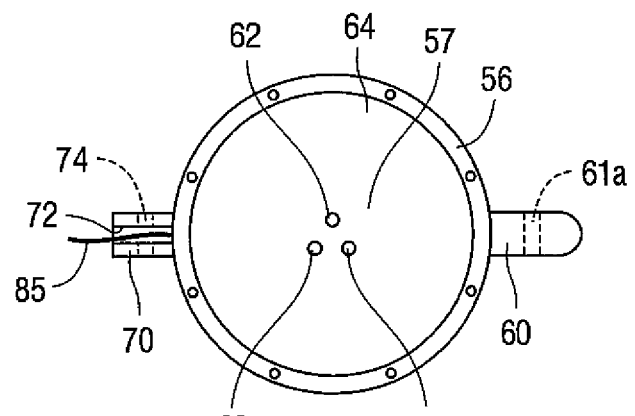
Figure 7:
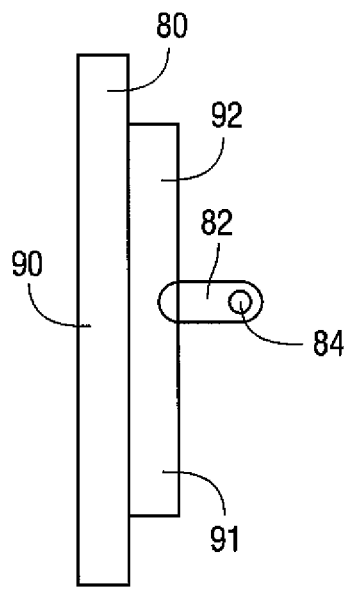
Figure 8:
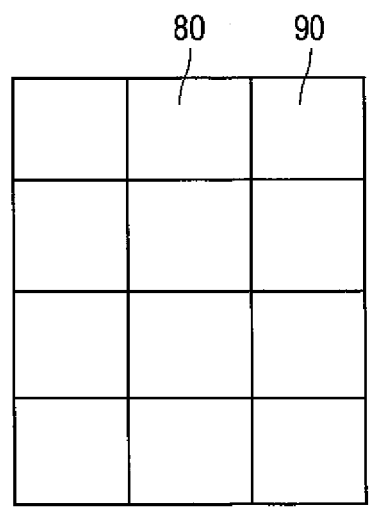
Figure 9:
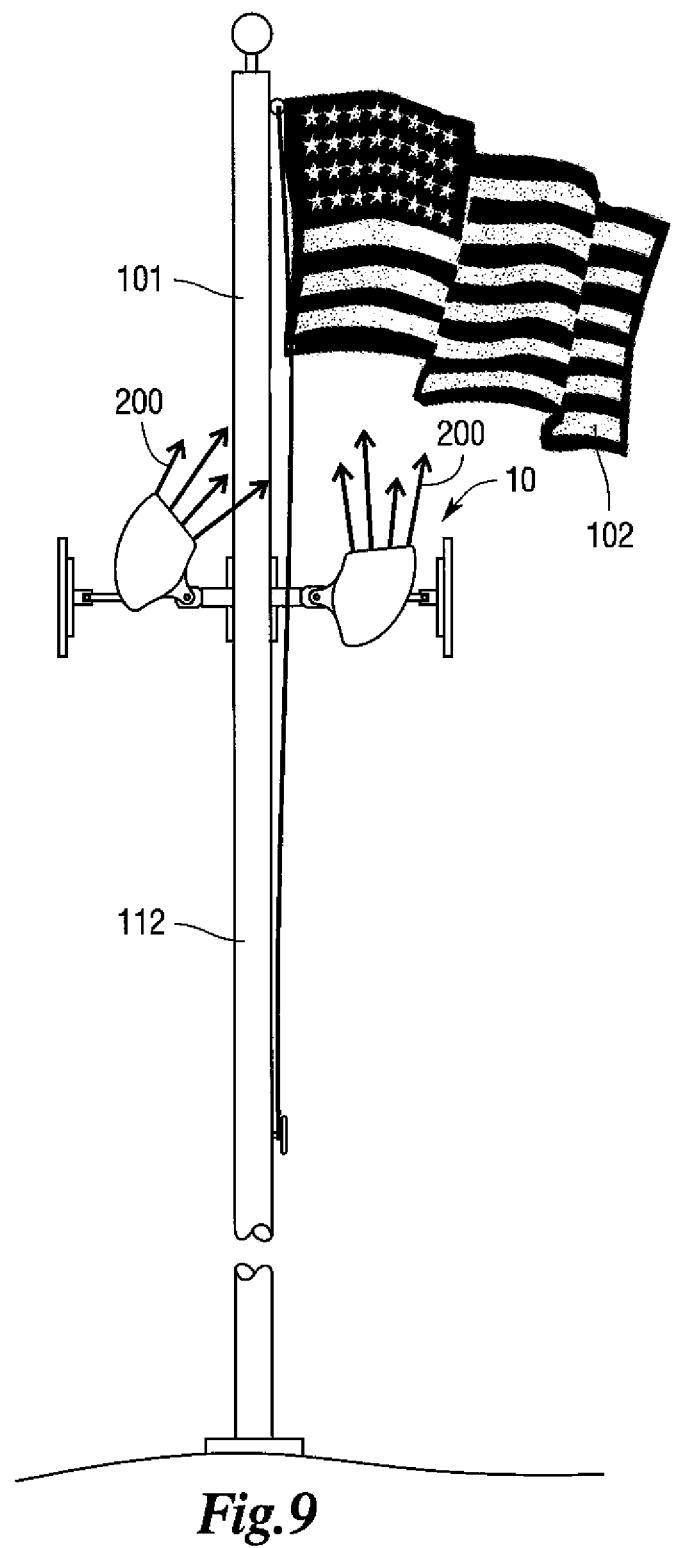
Figure 10:
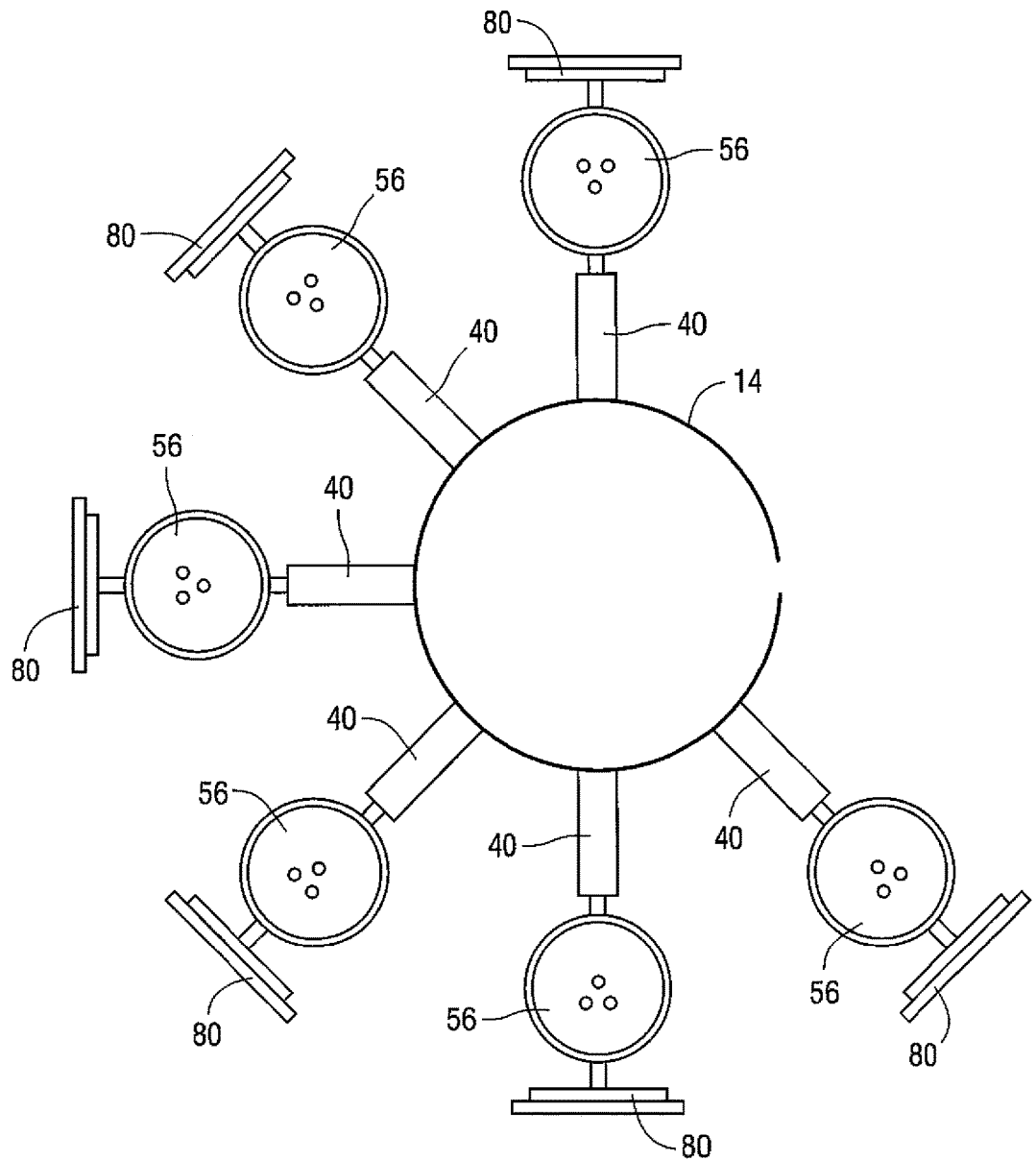
Figure 11:
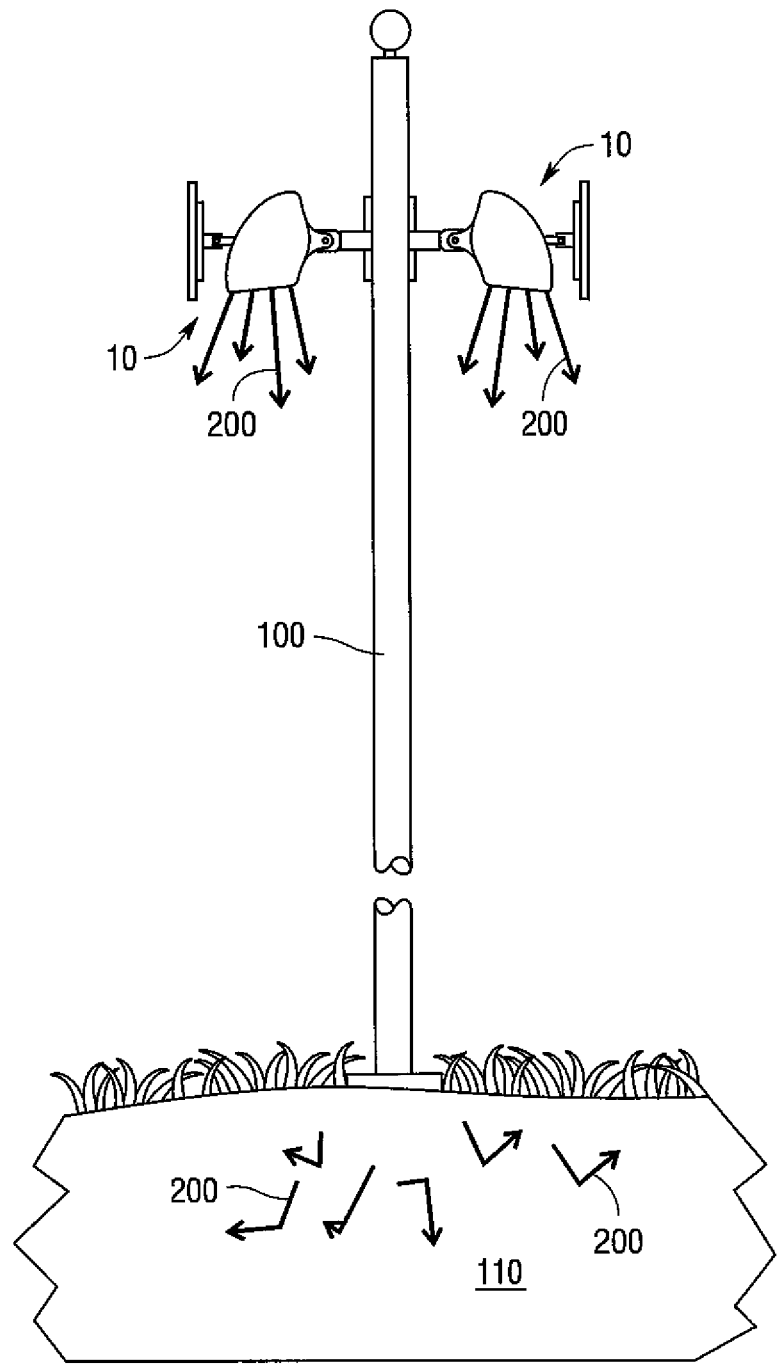
Figure 12:
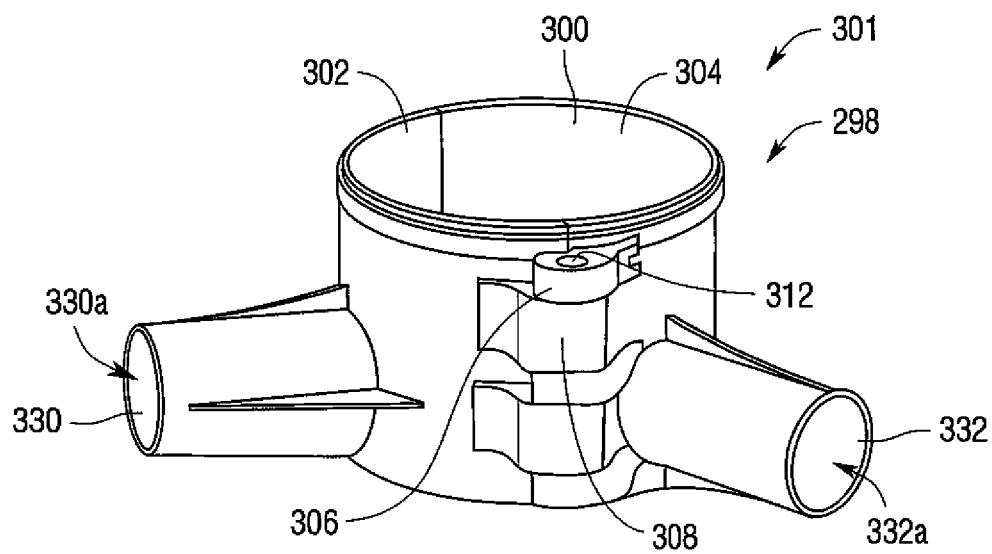
Figure 13:
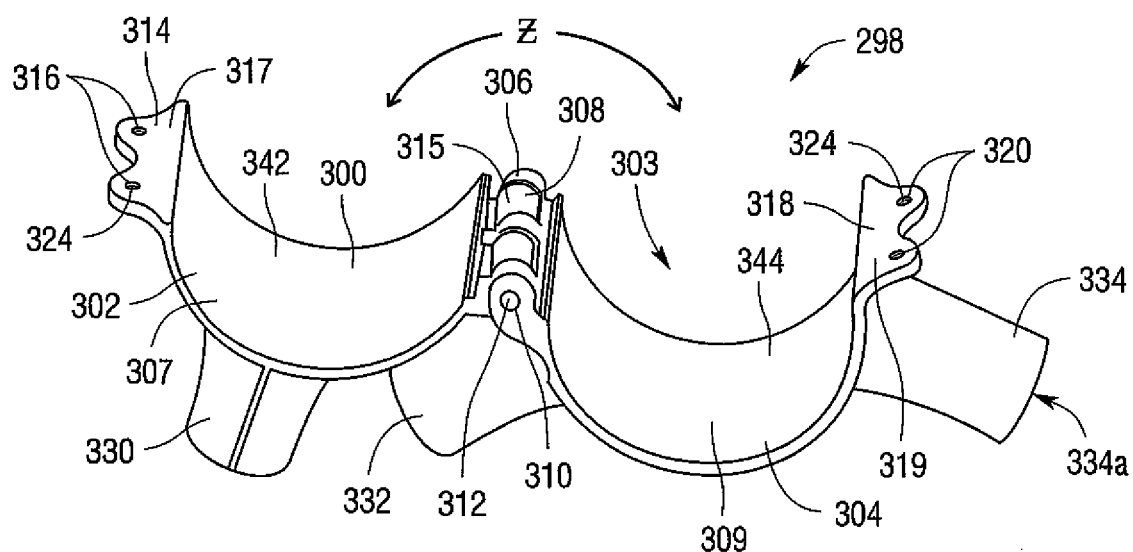
Figure 16:
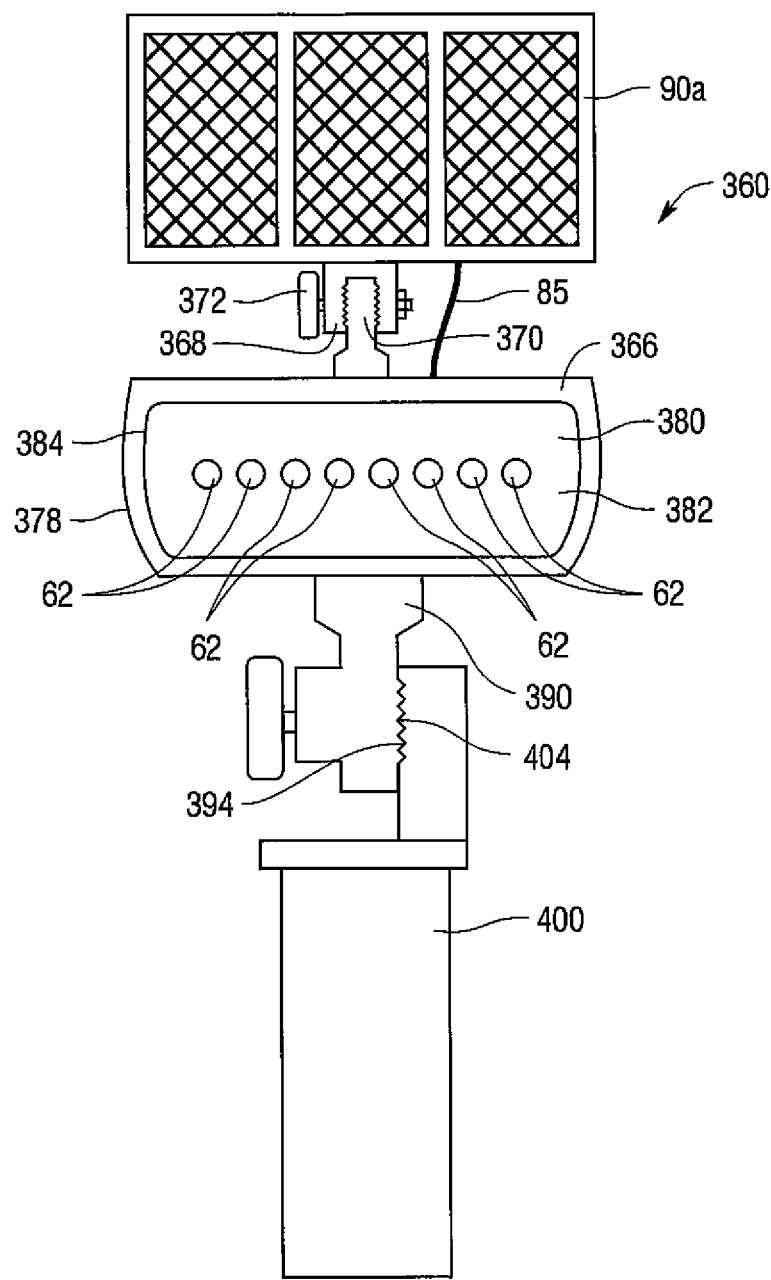
Figure 17:
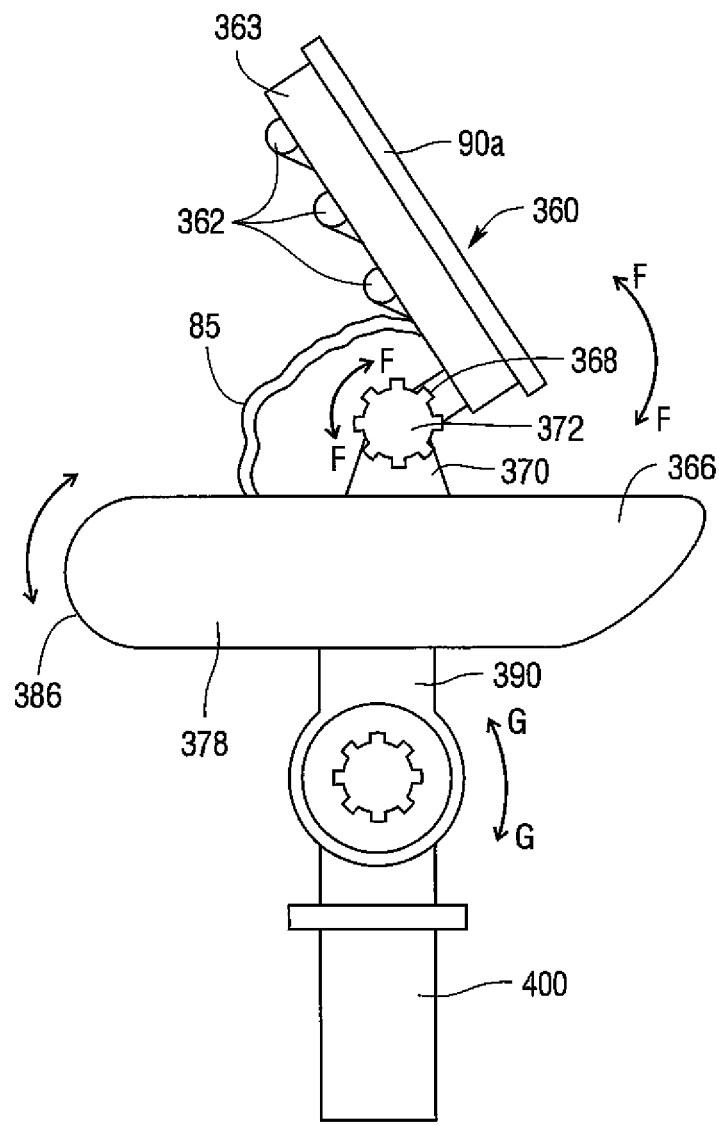
Figure 18:
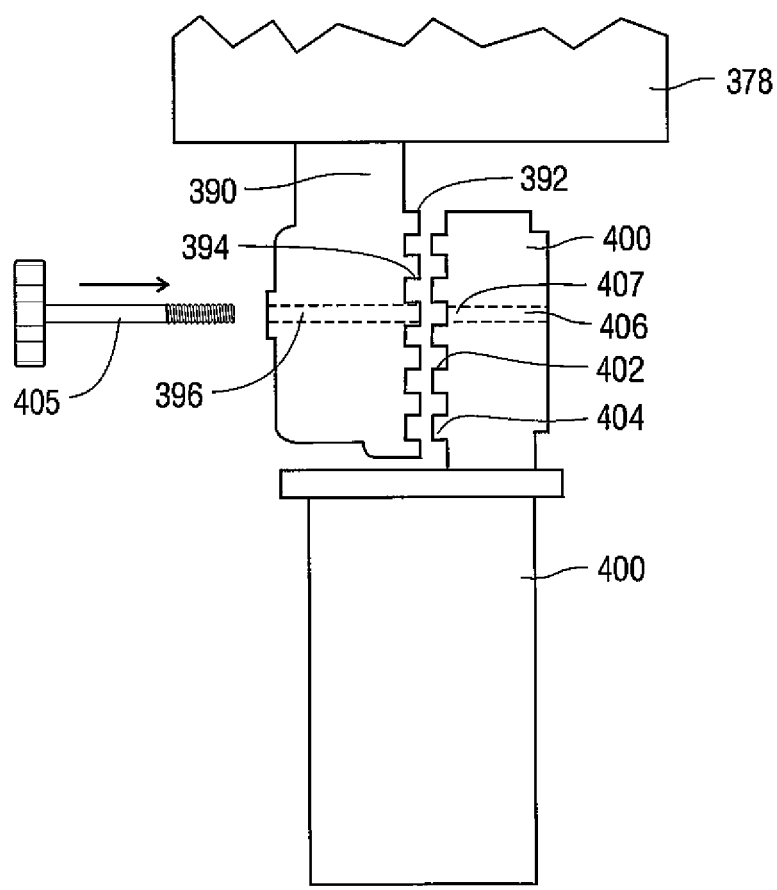
Figure 19:
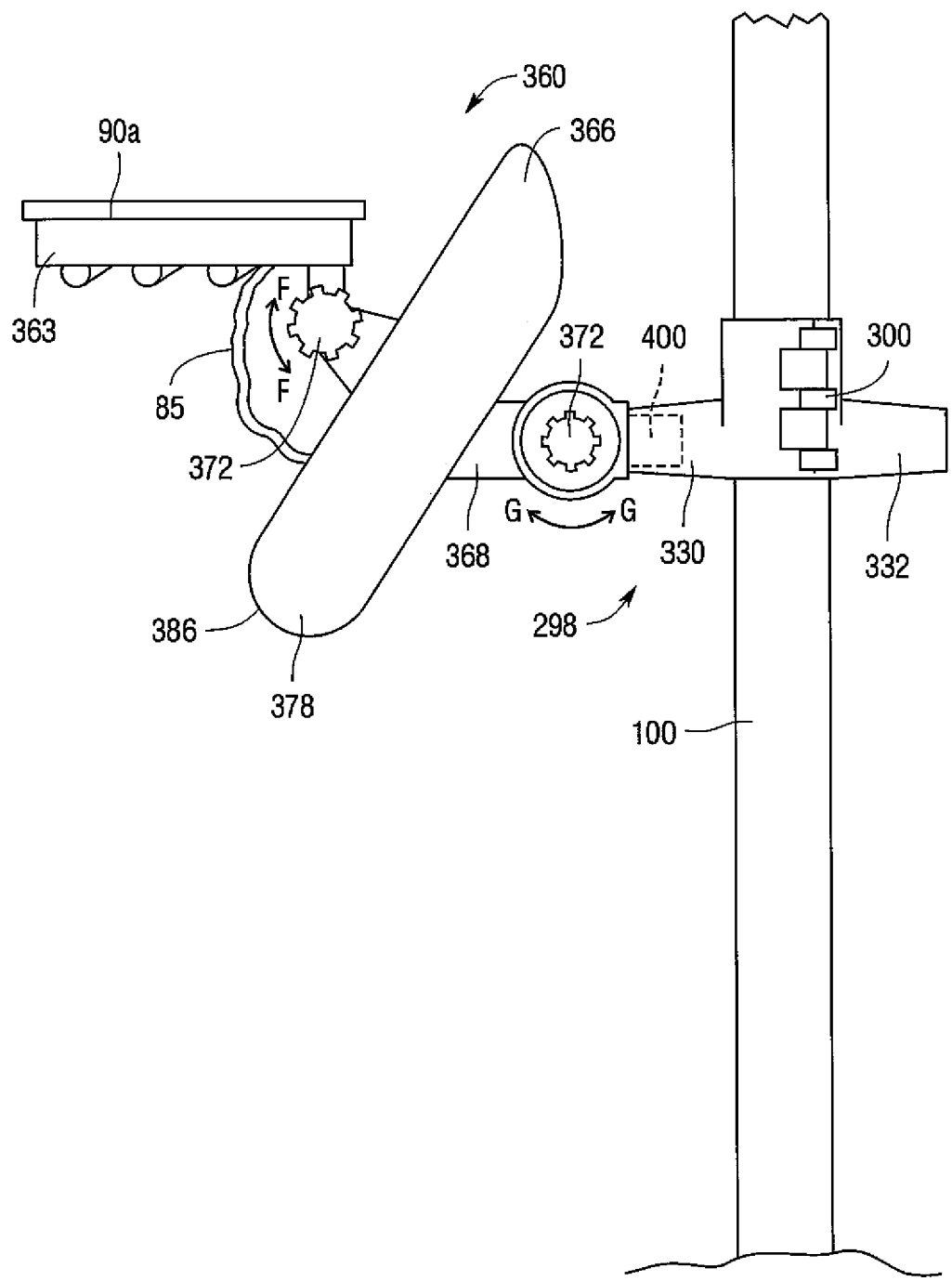

FIG. 1 is a top plan view of an illumination device.
FIG. 2 is a perspective view of a pole mount.
FIG. 2A is a front elevational view of the pole mount as it is being installed on a flagpole.
FIG. 2B is a front elevational view of the mount installed on a flagpole.
FIG. 3 is a front elevational view of a light support.
FIG. 3A is a right end view of the light support.
FIG. 3B is a left end view of the light support.
FIG. 3C is a top plan view of the light support.
FIG. 4 is a front elevational view of the illumination device.
FIG. 5 is a front elevational view of the lighting unit.
FIG. 6 is a top view of the lighting unit.
FIG. 7 is a front elevational view of a solar panel assembly.
FIG. 8 is a left side view of the solar panel assembly.
FIG. 9 is a front view of the illumination device in use.
FIG. 10 is another embodiment of an illumination device.
FIG. 11 is an embodiment wherein the illumination device is installed on a pole in an inverted position to provide ground lighting.
FIG. 12 is a perspective view of a pole mount clamp in a closed position.
FIG. 13 is a top perspective view of the pole mount clamp in an open position.
FIG. 14 is a top perspective view of the pole mount clamp is an open position from a different angle than that shown in FIG. 13.
FIG. 15 is a top plan view of the pole mount clamp.
FIG. 15A is a top plan view of a ring insert.
FIG. 15B is a top plan view of a split ring insert.
FIG. 16 is a front view of a light emitting assembly that is capable of being supported by the pole mount clamp.
FIG. 16A is a front view of another embodiment of the light emitting assembly that is capable of being supported by the pole mount clamp having a shaped insertion portion.
FIG. 16B is a section view of FIG. 16A taken along line X-X of FIG. 16A.
FIG. 17 is a side view of the light emitting assembly.
FIG. 18 is a side view of a toothed clamp.
FIG. 19 is a side view of the light emitting assembly supported by a pole mount clamp that is clamped to a pole.

Figure 20:
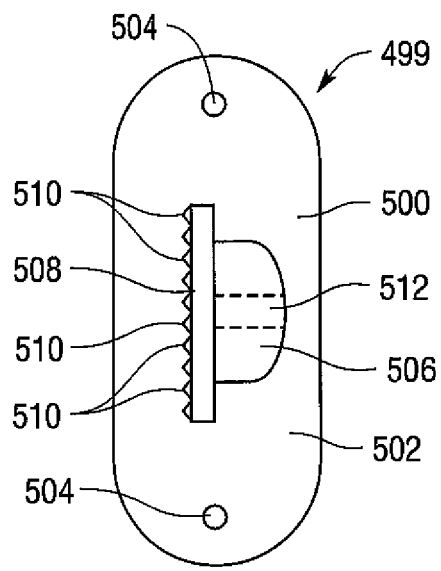
Figure 21:
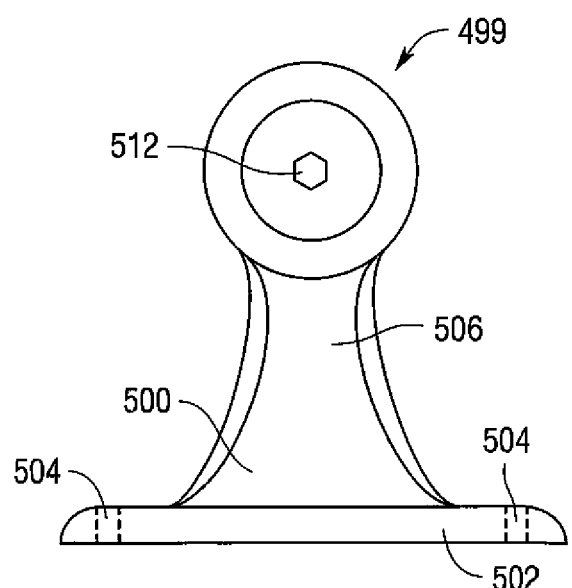
Figure 21A:
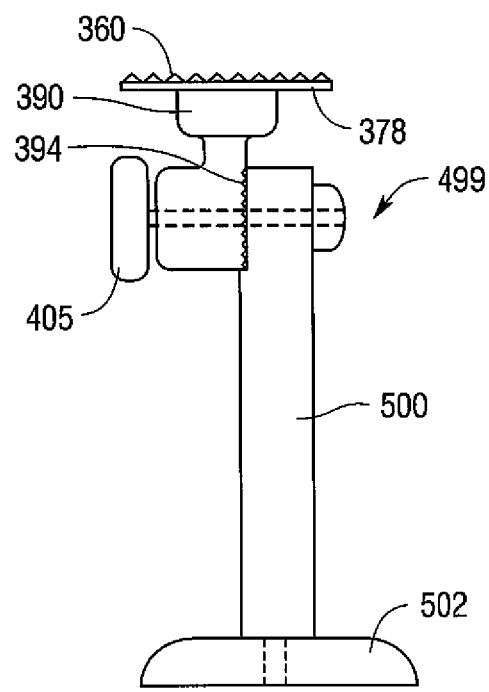
Figure 22:
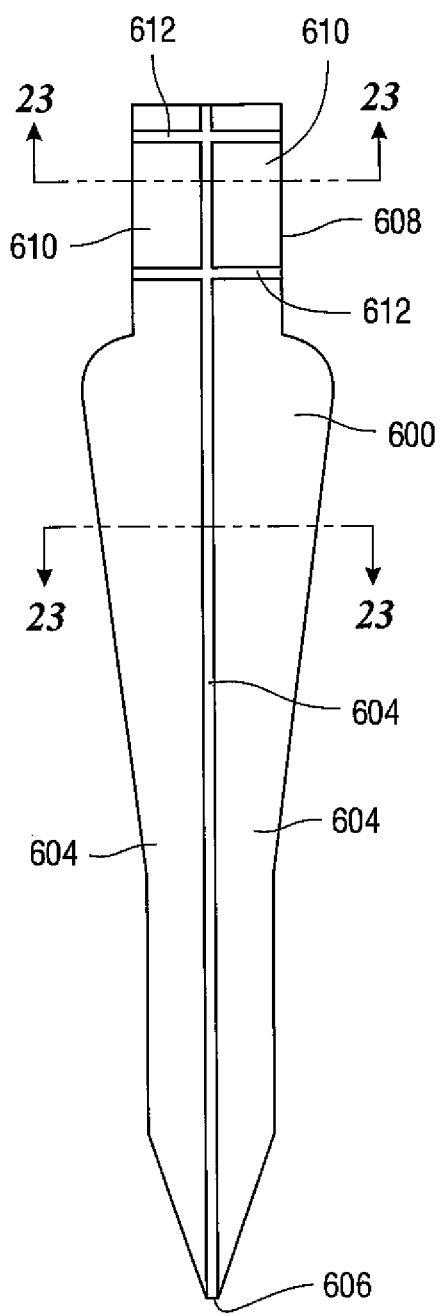
Figure 23:
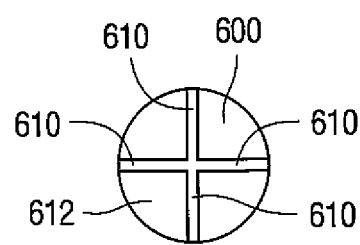
Figure 24:
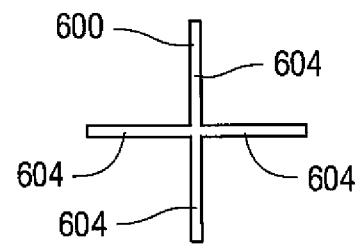
Figure 30:
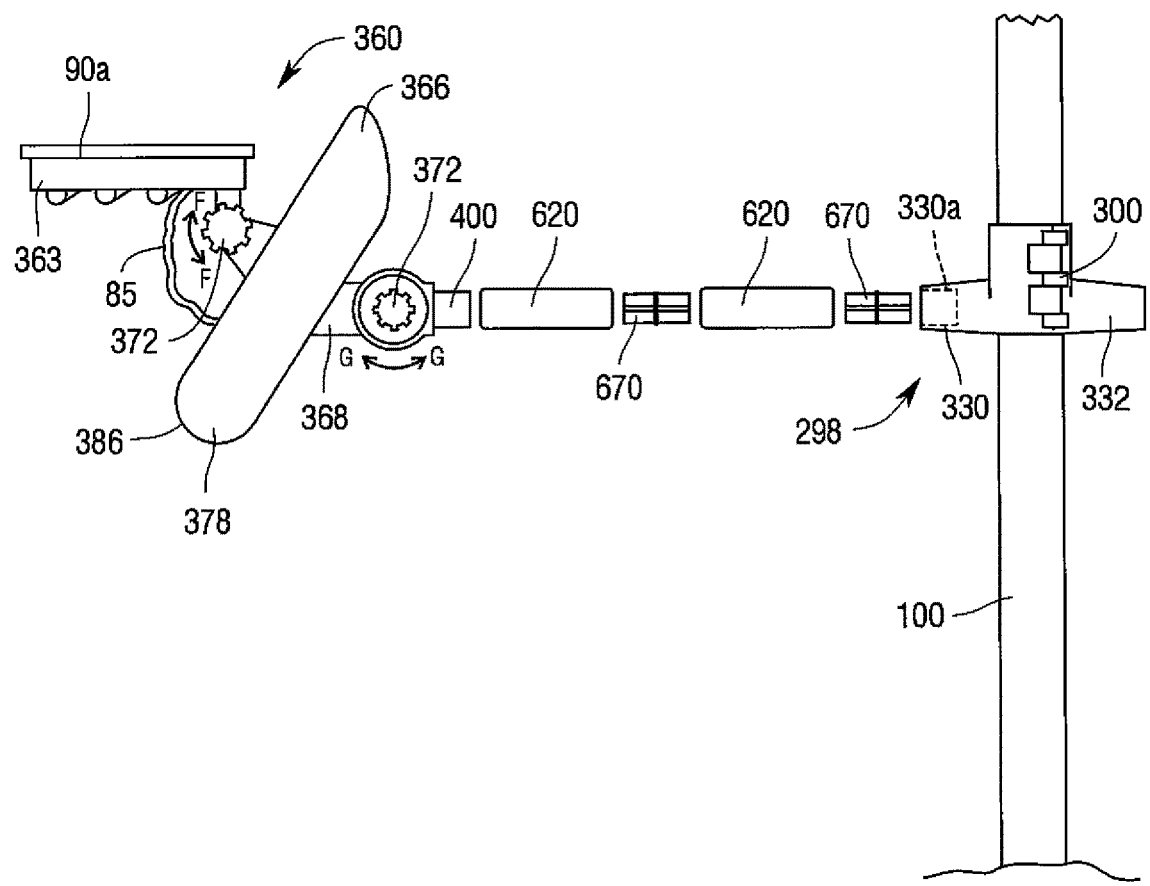
Figure 31:
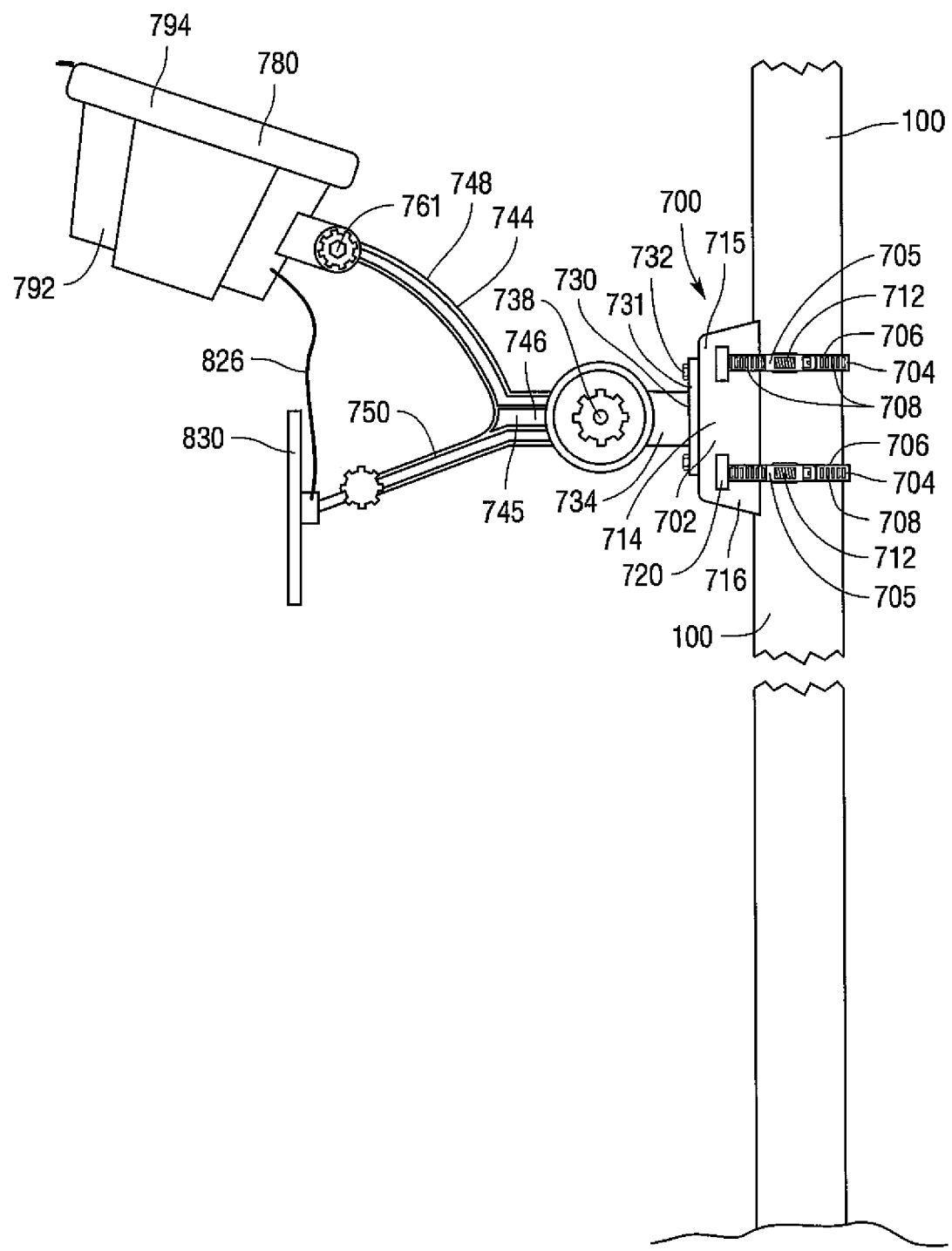
Figure 32:
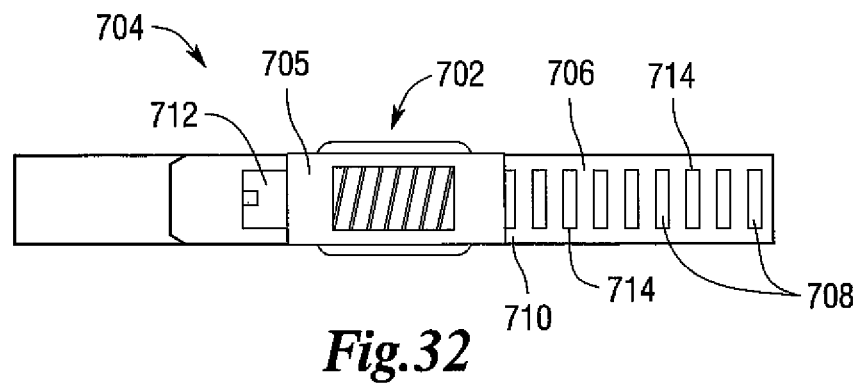
Figure 33:
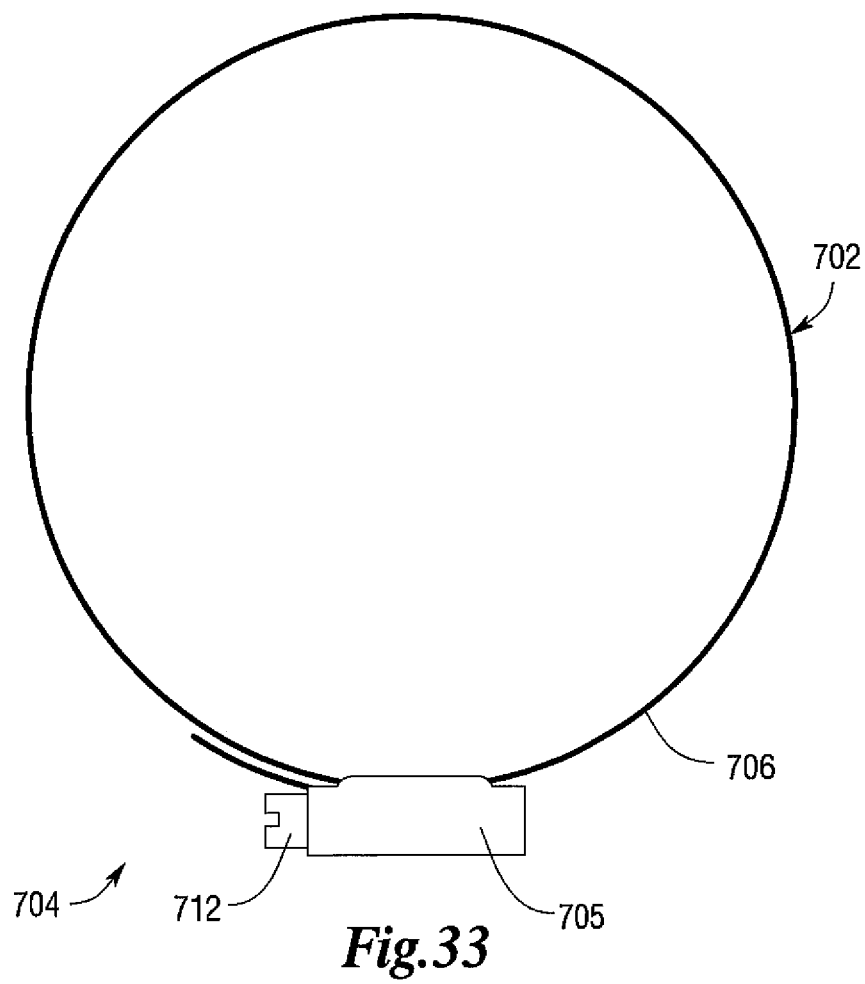
Figure 34:
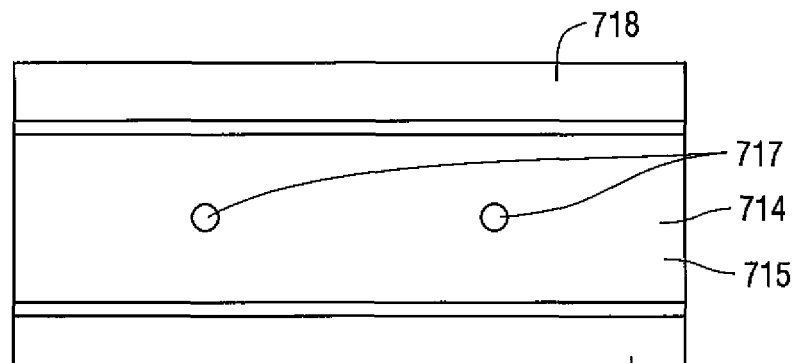
Figure 35:
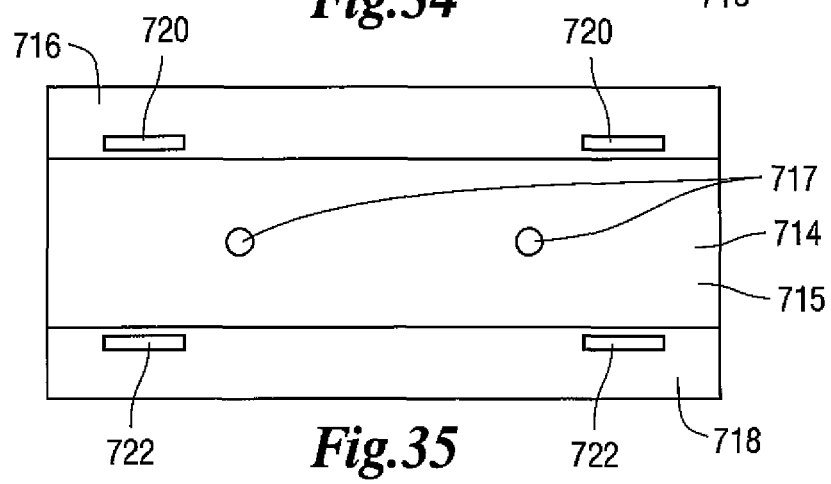
Figure 36:
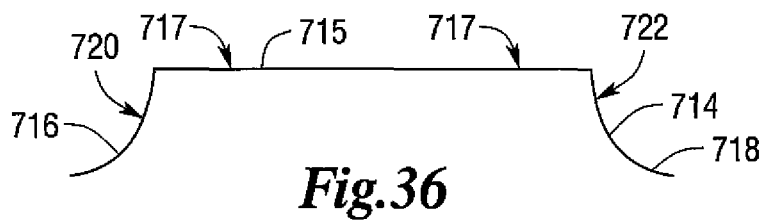
Figure 37:
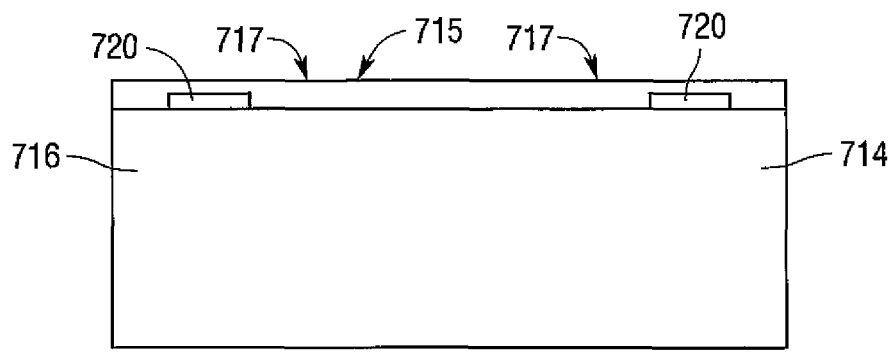
Figure 38:
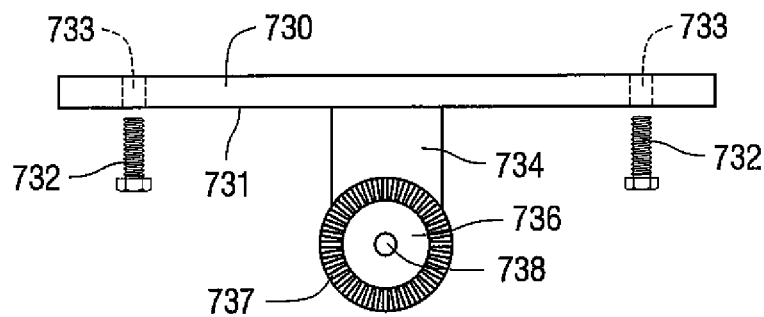
Figure 39:
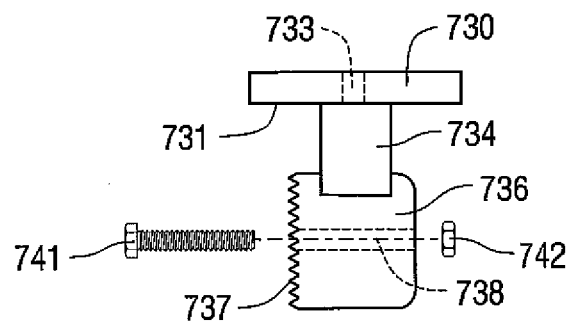
Figure 40:
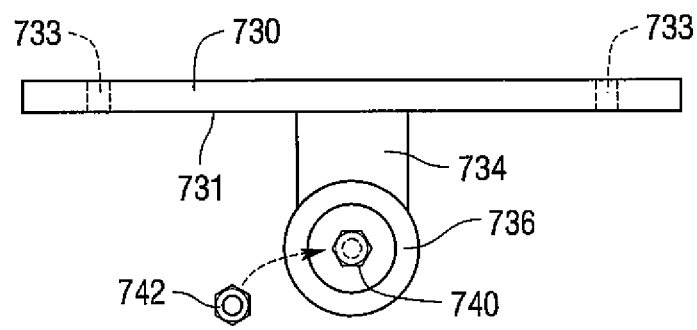
Figure 41:
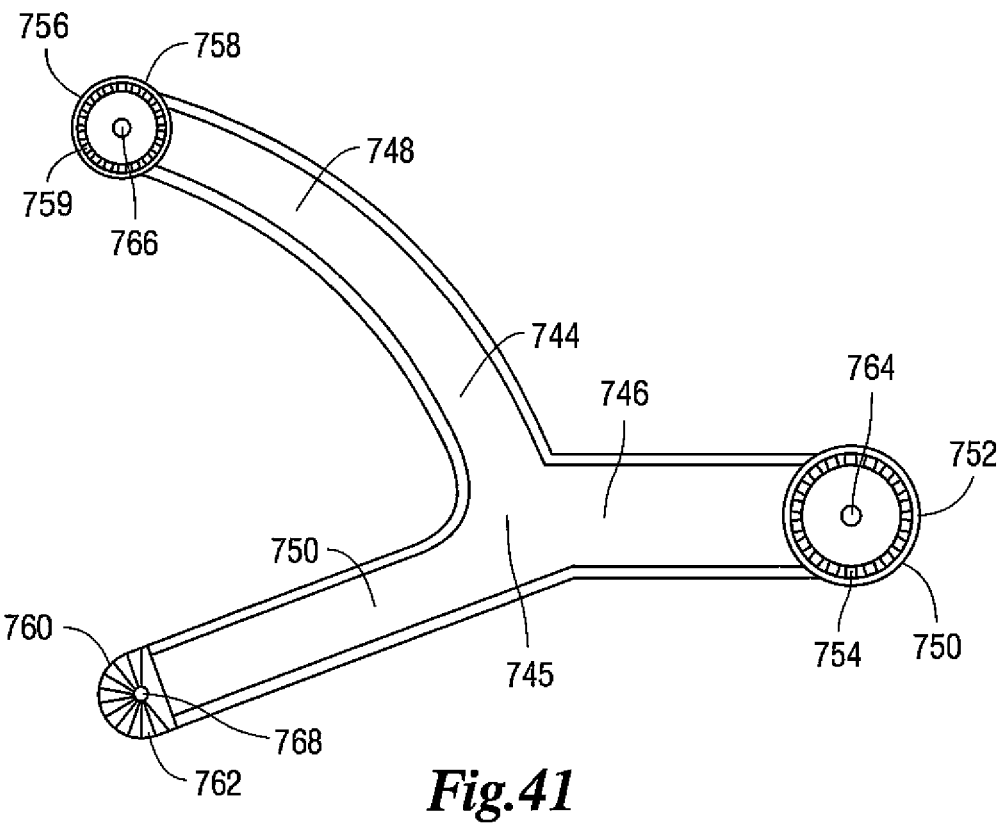
Figure 42:
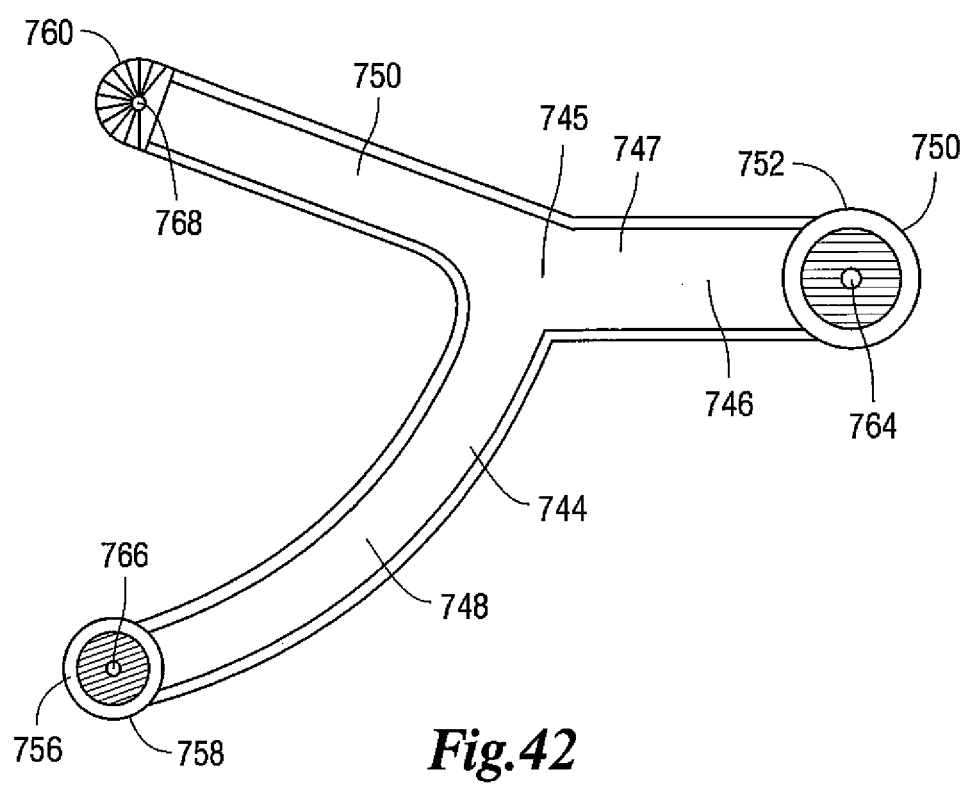
Figure 43:
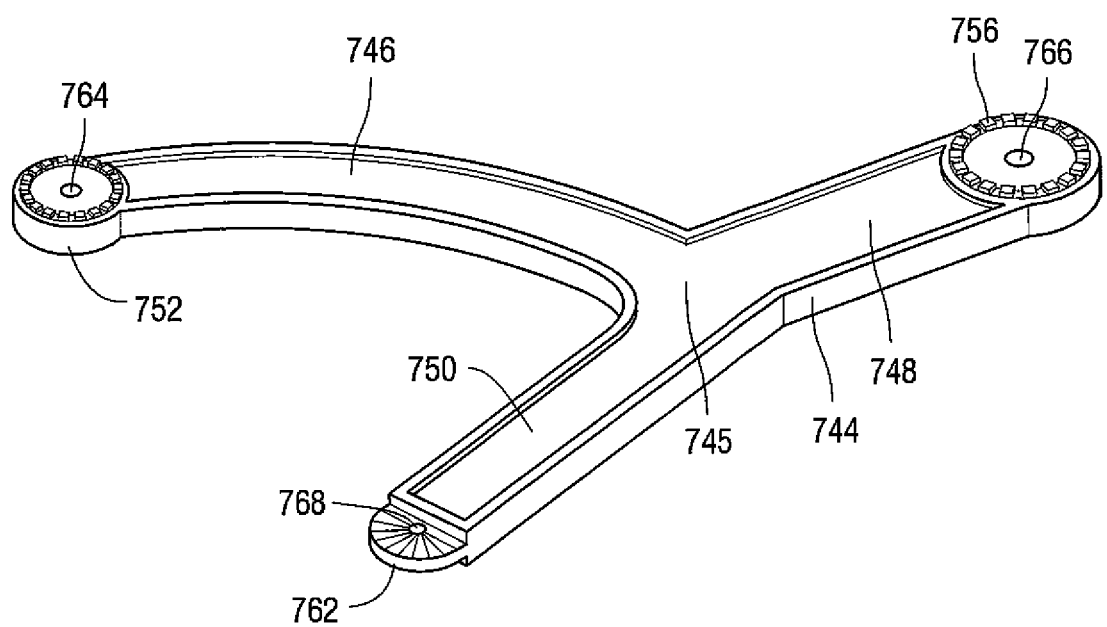
Figure 44A:
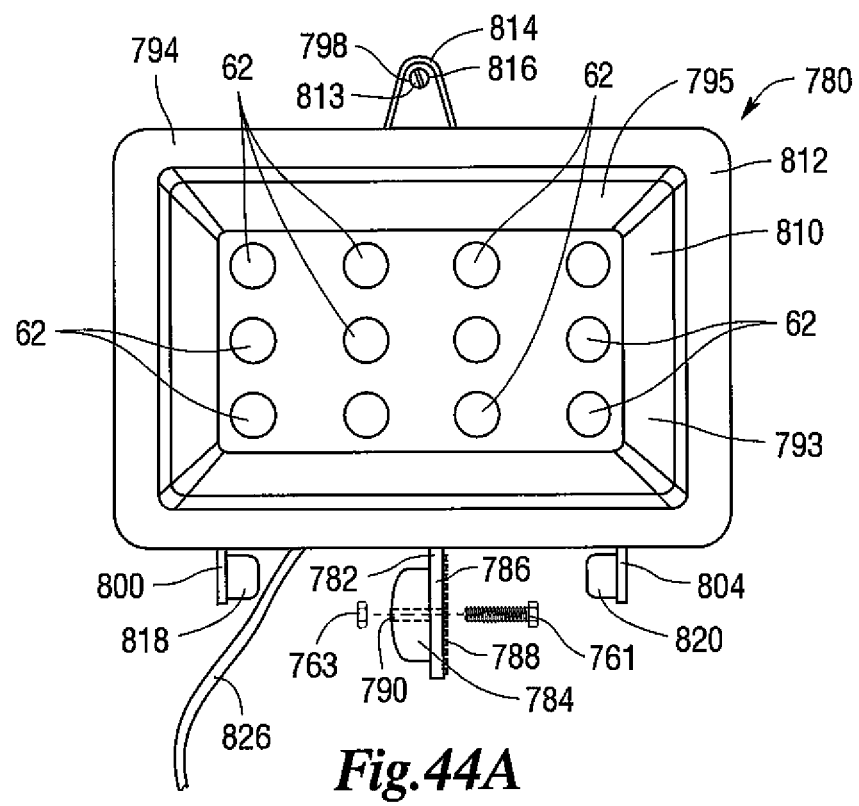
Figure 44B:
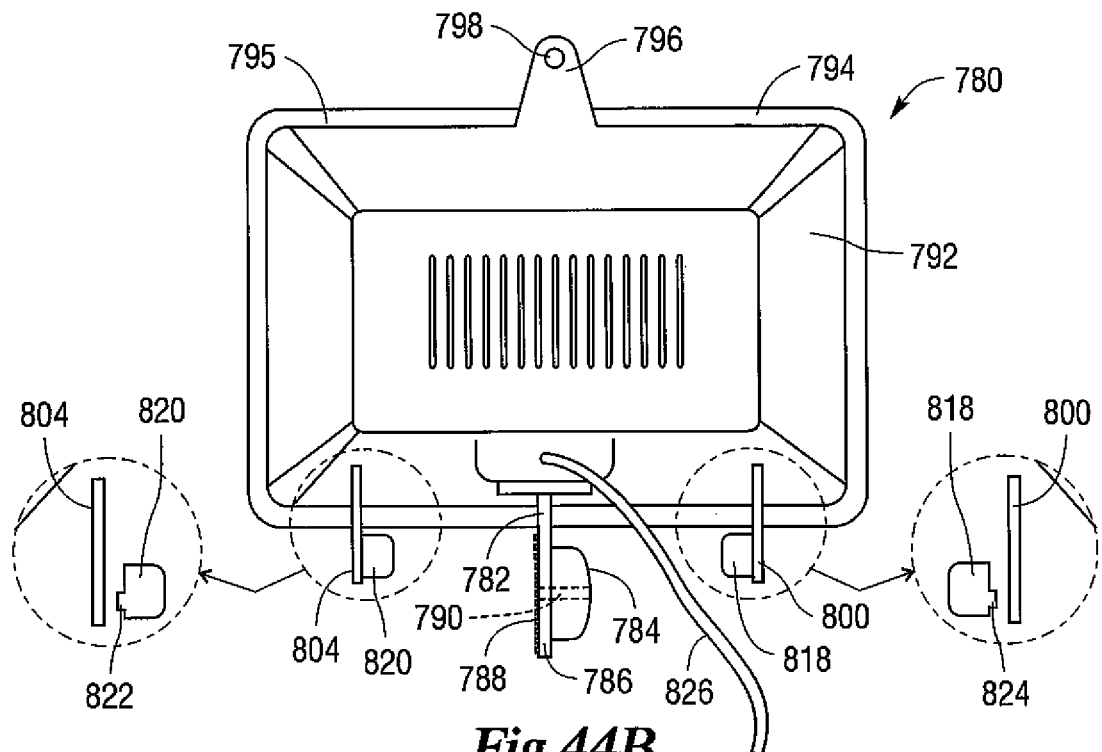
Figure 45:
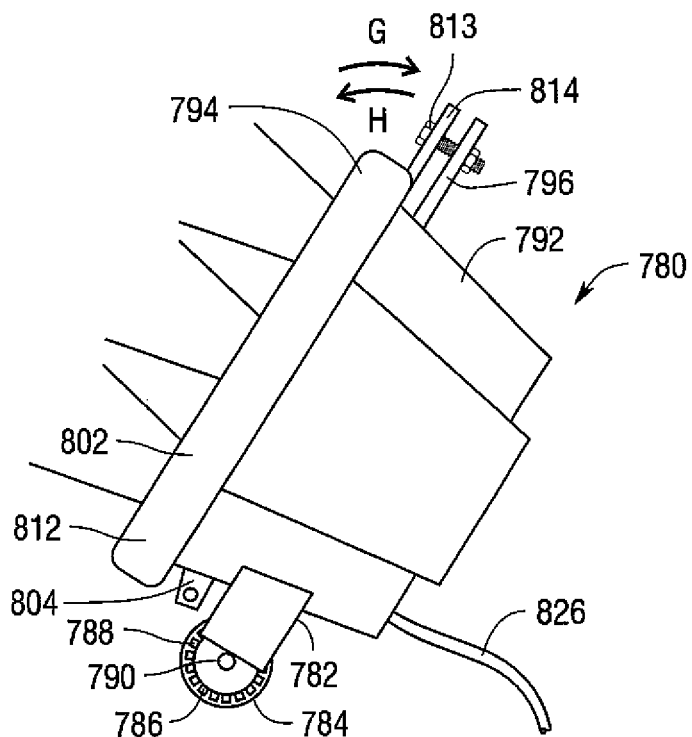
Figure 46:
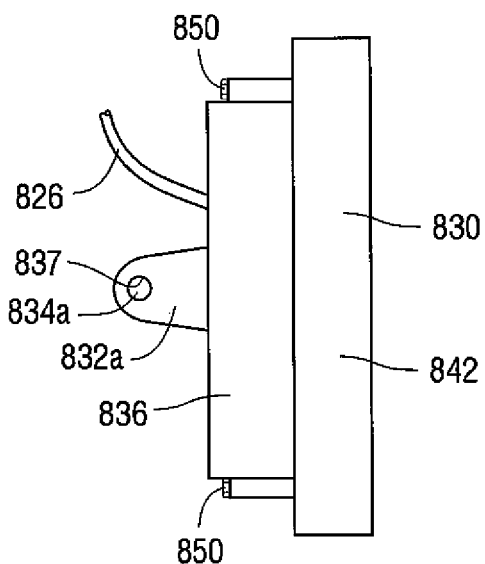
Figure 47:
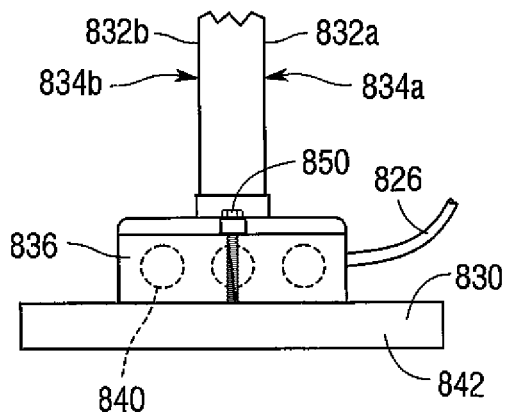
Figure 48:
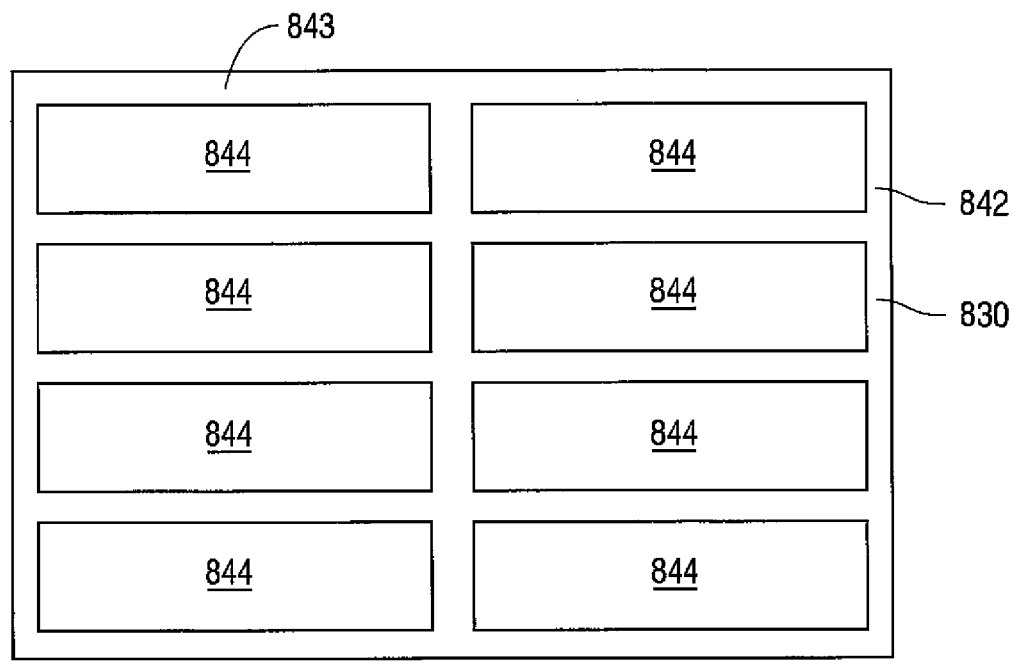
Figure 49:
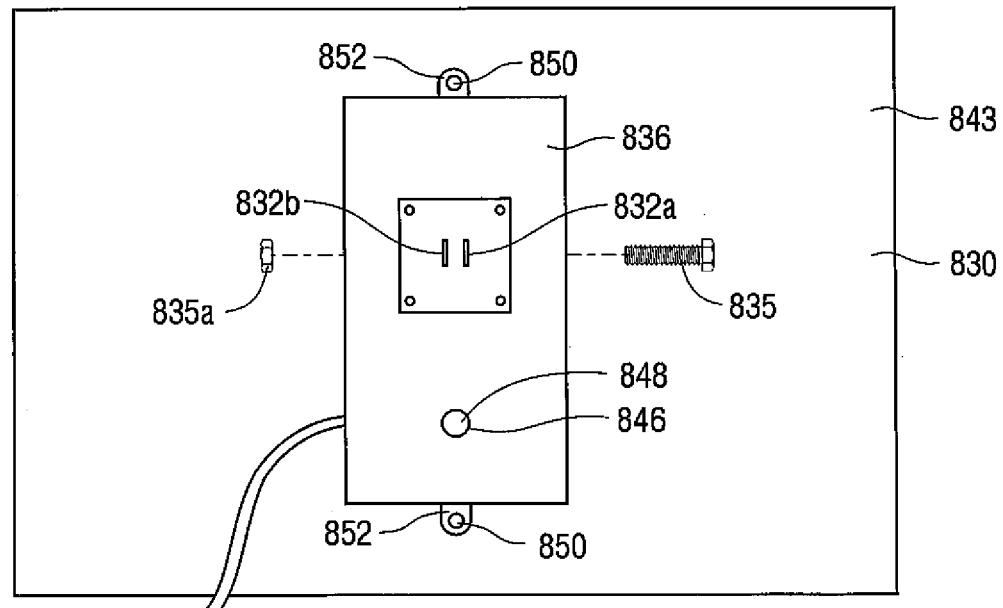
Figure 50:
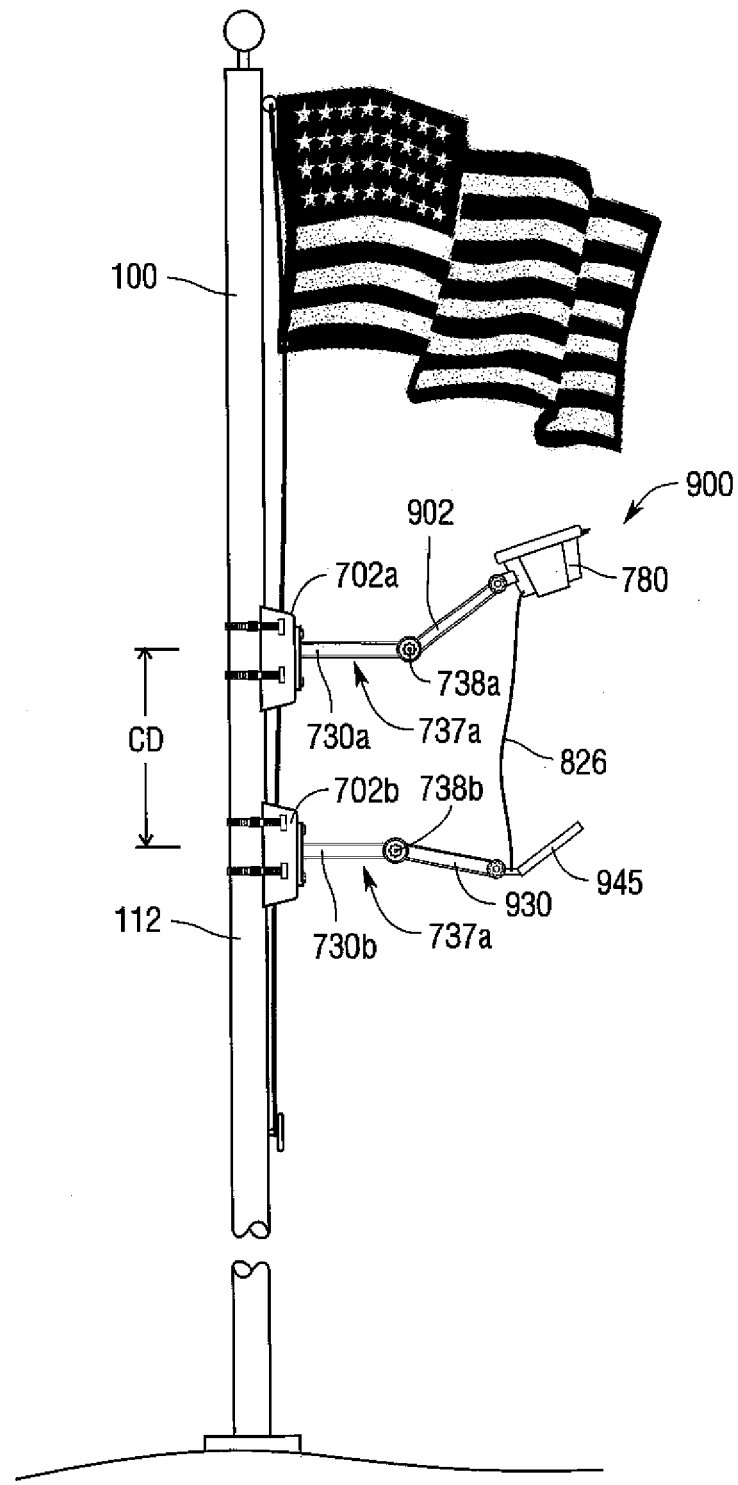
Figure 51:
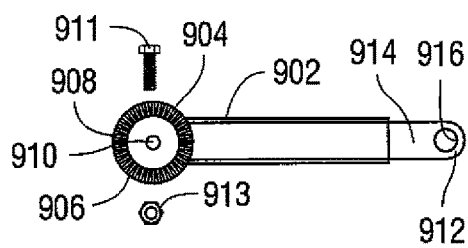
Figure 54:
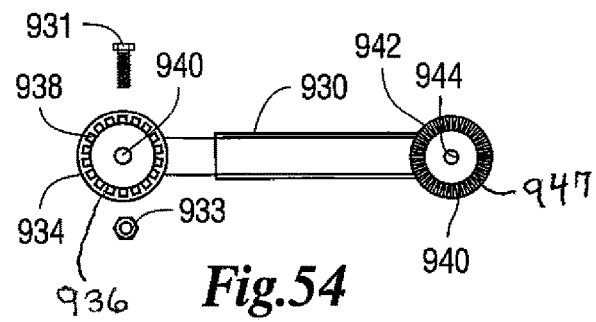
Figure 52:
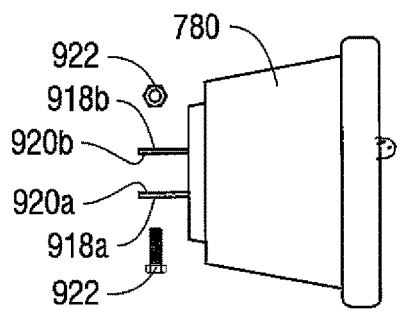
Figure 55:
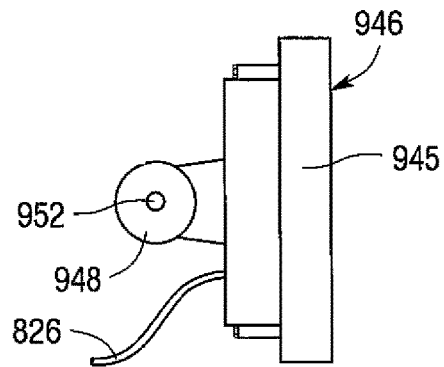
Figure 53:
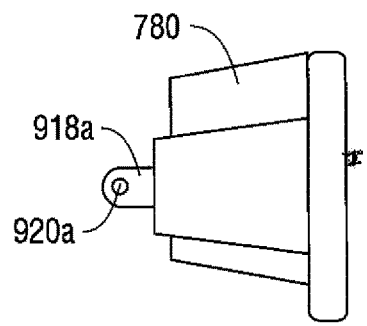
Figure 56:
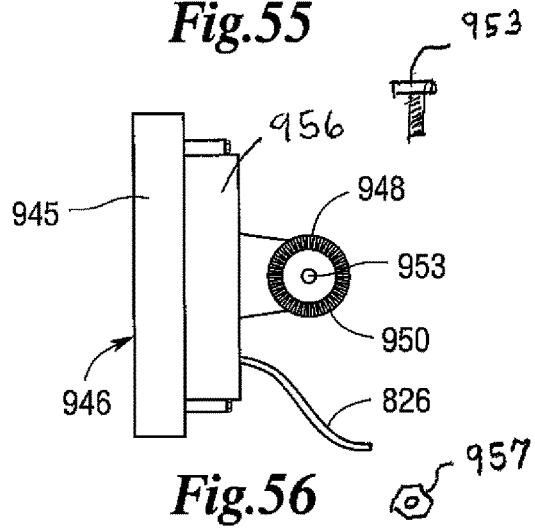

FIG. 20 is a top view of an embodiment showing an arm mount.
FIG. 21 is a front view of the arm mount of FIG. 20.
FIG. 21A is a side view of the arm mount and a portion of the light emitting assembly.
FIG. 22 is a front view of a ground spike.
FIG. 23 is a sectional view of the ground spike taken along line Z-Z of FIG. 22.
FIG. 24 is a sectional view of the ground spike taken along line Y-Y of FIG. 23.
FIG. 25 is top view of an extension member.
FIG. 26 is an end view of the extension member.
FIG. 26A is a view of the ground spike as a connecting member is moved on the ground spike in the direction of arrow K and an arm insert capable of being received in the connecting member.
FIG. 27 is a top view of a connector member.
FIG. 28 is an end view of the connector member.
FIG. 29 is a diagrammatic view of the connector member, extension member and the ground spike.
FIG. 30 is a diagrammatic view of connector members, extension members, the pole mount and the lighting assembly where the connector and extension members increase the distance of the lighting assembly from the pole mount.
FIG. 31 is a front view of a band illumination device supported on a pole.
FIG. 32 is a front view of a screw band clamp.
FIG. 33 is a top plan view of the screw band clamp.
FIG. 34 is a top plan view of a pole engagement component.
FIG. 35 is a bottom view of the pole engagement component.
FIG. 36 is a left side view of the pole engagement component.
FIG. 37 is a front view of the pole engagement clamp.
FIG. 38 is a front view of a pole engagement mount.
FIG. 39 is a right side view of the pole engagement mount.
FIG. 40 is a rear view of the pole engagement mount.
FIG. 41 is a front view of a branched support member.
FIG. 42 is a rear view of the branched support member.
FIG. 43 is a perspective view of the branched support member.
FIG. 44A is a front view of a clamped lighting assembly.
FIG. 44B is a rear view of the clamped lighting assembly.
FIG. 45 is a right side view of the clamped lighting assembly.
FIG. 46 is a left side view of a solar panel assembly.
FIG. 47 is a top view of the solar panel assembly.
FIG. 48 is a front view of the solar panel assembly.
FIG. 49 is a rear view of the solar panel assembly.
FIG. 50 is a front view of another preferred embodiment showing an adjustable band illumination assembly installed on a pole.
FIG. 51 is a side view of light arm component.
FIG. 52 is a top view of a clamped lighting assembly.
FIG. 53 is a side view of a clamped lighting assembly.
FIG. 54 is a side view of a solar arm component.
FIG. 55 is a front view of a solar panel unit.
FIG. 56 is a rear view of the solar panel unit.
FIG. 57 is a front view of another preferred embodiment showing a spike illumination assembly.
FIG. 58 is a front view of another portion of the a spike illumination assembly.

DESCRIPTION

FIG. 1 is a top plan view of the illumination device 10 for illuminating, for example, a flag 102 supported on a pole 100

(shown in FIG. 9), and the pole 100 may embodied to be virtually any pole including a flagpole 101. The pole 100 is supported in the ground 99.

As shown in FIG. 2 the illumination device 10 includes a pole mount 14 that has a cylindrical shape and has a surrounding sidewall 15 and facing first and second gap edges 24, 26. When the facing first and second gap edges 24, 26 abut one another the pole mount 14 has an internal diameter designated D in FIG. 2 of about four inches. It is to be understood that the diameter D can be embodied to have any diameter required for a particular application, that is, to fit around poles 100 having different diameters D. For example, the diameter D of the pole mount 14 can be one inch to four inches. The pole mount 14 is made of a flexible material, for example flexible polyvinyl chloride (PVC), flexible plastics, and other suitable flexible materials.

The surrounding sidewall 15 has an interior pole mount surface 16 and an opposed exterior pole mount surface 18, and opposed first and second pole mount ends 20, 22. The facing first and second gap edges 24, 26 define a gap space 27 designated G1 in the surrounding sidewall 15 when the pole mount 14 is in an unexpanded position 17 (shown in FIG. 2). As shown in FIGS. 2A and 2B, attached or joined to the exterior pole mount surface 18 is a first strip of fabric 28a having hooks 28 and the hooks 28 are exposed. Also attached to the exterior pole mount surface 18 is a second strip of fabric 30a having loop portion 30b having loops 30. In particular, the loop portion 30b has opposed first and second loop portion sides 30c, 30d, and the loops 30 extend first loop portion side 30c. The loop portion 30 is not joined to the exterior pole mount surface 18. The hooks 28 and loops 30 are capable of being releaseably attached to one another in a known manner. The first and second strips of fabric 28a, 30a are also horizontally aligned with one another such that they can be releasably joined. The first and second strips of fabric 28a, 30a are joined to the exterior pole mount surface 18 with a weatherproof adhesive or glue 23 in one of the preferred embodiments.

As mentioned, the surrounding sidewall 15 of the pole mount 14 is flexible and thus the gap space 27, as measure from the first gap edge 24 to the second gap edge 26, can be manually increased. That is, the distance from the first gap edge 24 to the second gap edge 26 can be increased manually (as indicated by arrow A in FIG. 2) such that pole mount 14 can be manually fitted around the pole 100 without breaking. The pole mount 14 is shown in the expanded position 17a in FIG. 2A as it is being fitted on the pole 100. As shown in FIG. 2A the gap space 27 is designated G2, and G2 is greater than G1 as the pole mount 14 is fitted on the pole 100.

After having been fitted on the pole 100 the pole mount 14 returns to its unexpanded position 17. As shown in FIG. 2B the hooks 28 are joined to the loops 30 of the loop portion 30b of the second strip of fabric 30a such that the pole mount 14 is compressed against the pole 100 such that the interior pole mount surface 16 abuts the pole 100. It is pointed out that the second gap edge 26 can overlap the first gap edge 24 of the pole mount 14 such that the pole mount 14 can be secured to poles 100 having different diameters. In this manner the pole mount 14 is secured to the pole 100 and is capable of supporting loads applied thereto.

As shown in FIG. 2, the pole mount 14 also defines a bolt opening 34 with three such bolt opening 34 being shown in the figure. Each of the bolt openings 34 is for receiving a bolt 36 such that a head 38 of the bolt 36 abuts against the interior pole mount surface 16. FIG. 2B shows a bolt 36 extending from the pole mount 14 for illustrative purposes. The head 38 of the bolt 36 abuts the pole 100 and abuts the interior pole mount surface 16 such that a threaded portion 39 of the bolt 38 extends in a direction that is substantially perpendicular to the pole 100. In other preferred embodiments there can be more or less than three bolt openings 34 defined in the pole mount 14.

As shown in FIGS. 1 and 3-3C, the illumination device 10 also includes a light support 40, with three light supports 40 being shown. Each light support 40 is a one-piece body and has a cylindrical portion 41 that merges with an attachment portion 42 and it is made of plastic in one of the preferred embodiments. The cylindrical portion 41 has a contoured end 43 best shown in FIG. 3C that leads to a recess 44 (FIG. 3A) defined in the light support 40. The cylindrical portion 41 is joined with an end wall 45 that has an interior end wall side 45a and an opposed exterior end wall side 45b (FIG. 3B). The cylindrical portion 41 and the interior end wall side 45a define the recess 44. The end wall 45 also defines an end wall opening 46 sized to allow the bolt 36 to pass therethrough. It is pointed out that the contoured end 43 has a concave surface 43a such that when the contoured end 43 is fitted against the exterior pole mount surface 18 of the pole mount 14 the contoured end 43 abuts the exterior pole mount surface 18. In particular, the exterior pole mount surface 18 has a convex surface 18a that abuts against the concave surface 43a of the contoured end 43 of the light support 40, as shown in FIG. 1. It is pointed out that glues, caulk or epoxy can be used where light support 40 abuts the pole mount 14.

As shown in FIGS. 3B and 3C the attachment portion 42 of the light support 40 includes a pair of spaced apart support brackets 48a, 48b, that extend substantially perpendicularly from the end wall 45, and each defines a pivot pin opening commonly designated 49. Disposed between the pair of spaced apart support brackets 48a, 48b is a nut 50, and opposed flat portions of the nut 50 abut against the end wall 45 and abut against the pair of spaced apart support brackets 48a, 48b. Due to this arrangement, the nut 50 is held in place and is not capable of rotating or being rotated.

The light support 40 is attached to the pole mount 14 by installing the previously described bolt 36 through the bolt openings 34. Then the contoured end 43 of the light support is abutted against the pole mount 14 in the manner previously described. The bolt 36 is then threaded to the nut 50 and tightened thus securing the light support 40 to the pole mount 14.

The illumination device 10 also includes a lighting unit 56. In particular, as shown in FIGS. 1 and 4-6 the pair of spaced apart support brackets 48a, 48b are pivotally connected to the lighting unit 56. The lighting unit 56 has a lighting assembly 57 disposed in a light housing 60 and is powered by electrical power. As shown in FIG. 5, extending from the light housing 60 is a housing extension 61 that defines a pivot pin bore 61a. A pivot pin 58 is fitted in the pivot pin openings 49 defined in the pair of spaced apart support brackets 48a, 48b and in the pivot pin bore 61a to connect the light support 40 to the lighting unit 56. The pivot pin 58 can be replaced with a nut and bolt assembly 59 (FIG. 4) such that the user can adjust the angle of lighting unit 56 relative to the light support 40 and the pole 100 and then lock that position in place by tightening the nut and bolt assembly 59. Thus, the angle of the lighting unit 56 makes relative to the pole mount 14 (and pole 100) is infinitely variable by the user as shown by the arrow designated B in FIG. 4.

In addition, in one of the preferred embodiments the lighting assembly 57 includes a light emitting diode (hereinafter LED) 62 for producing light. The lighting assembly 57 can have three LED's 62 as shown in FIG. 6, or can have more or less than three LED's 62. The LED's 62 can emit white light or colored light. The lighting assembly 57 also includes a weatherproof transparent cover or lens 64. In other embodiments the lens 64 may be colored. LED's and the use and operation of such LED's are well known to those having ordinary skill in the art and they are therefore not described in greater detail herein. In addition, other suitable lights may be used for providing light in other preferred embodiments.

As also shown in FIGS. 4 and 6, the light housing 60 also has a extending from it a solar panel support arm 70, and the solar panel support arm 70 is diametrically opposed to the housing extension 61. The solar panel support arm 70 defines a support arm recess 72 and defines support arm bores 74.

As shown in FIGS. 4, 7 and 8 the illumination device 10 also includes a solar panel assembly 80 having a panel mount member 82. The panel mount member 82 defines a panel mount member bore 84. A solar panel pivot pin 86 is provided and is fitted in the support arm bores 74 and the panel mount member bore 84, thus attaching them together. The solar panel pivot pin 86 can embodied in the form of a nut and bolt assembly 59 (FIG. 4) such that the user can adjust the angle of panel mount member 82 relative to the solar panel support arm 70 and then lock that position in place by tightening the nut and bolt assembly 59. Thus, the angle the solar panel assembly 80 makes relative to the solar panel support arm 70 is infinitely variable by the user as shown by the arrow designated C in FIG. 4. In addition, the solar panel assembly 80 also includes a solar panel 90 and a rechargeable battery 92 for storing electrical power collected by the solar panel 90. The rechargeable battery 92 is disposed in a battery housing 91 and the solar panel 90 is mounted on and joined to the battery housing 91. Wires 85 (FIG. 6) extend from the solar panel assembly 80 to the lighting unit 56 to power the LED's 62. The use, operation and construction of solar panels, batteries for storing the electrical power collected by the solar panels, and the associated wiring and circuitry to power LED's is well known to those having ordinary skill in the art and is therefore not described in greater detail herein.

In use, the user installs the illumination device 10 on the pole 100 in the manner previously described and optionally at a height that is out of the reach of people who happen to pass by the pole 100. The user rotates the solar panels 90 to ensure maximum exposure to the sun. In one of the preferred embodiments the pole 100 is embodied as a flagpole 101. In such an embodiment the user also rotates the lighting units 56 to ensure the rays of light 200 (FIG. 9) make full contact with a flag 102 hanging from the flagpole 101. The solar panel assembly 80 will thereafter collect and store energy during the day and emit light at night on the flag 102, thus illuminating the flag 102.

In another preferred embodiment of the illumination device 10 the pole mount 14 is connected to four light supports 40 and the light supports 40 are spaced an equal distance from one another about the pole mount 14.

In another preferred embodiment of the illumination device 10 the pole mount 14 is connected to two light supports 40 that are spaced an equal distance from one another. That is, the light supports 40 extend in diametrically opposite directions from the pole mount 14.

In another preferred embodiment of the illumination device 10 there are three light supports 40 that are spaced equal distances from one another.

In another preferred embodiment the pole mount 10 and the light supports 40 can be formed of molded plastic such that the pole mount 10 and light supports 40 are in the form of as one-piece body. In this embodiment the need for the above-described bolt 36 and nut 50 is eliminated.

In another preferred embodiment the illumination device 10 is sold as a kit that may include a pole 100 or flagpole 101. The pole mount 14 may be made without the first and second gap edges 24, 26, that is, without the gap space 27, because the diameter of the pole 10 is known in advance. The first strip of fabric 28a having hooks 28 and the second strip of fabric 30a having loop portion 30b having loops 30 is provided for on the pole mount 14 as previously described, and they are used to compress the pole mount 14 on the flagpole 101.

FIG. 9 is a view of the illumination device 10 installed on a flagpole 101 at nighttime with rays of light 200 illuminating the flag 102.

FIG. 10 is another preferred embodiment wherein the illumination device 10 has a plurality of spaced apart lighting units 56. In other preferred embodiments the lighting units 56 can be equidistant from one another and the number of light units 56 can be varied, for example from one to eight lighting units 56.

FIG. 11 is another embodiment wherein the illumination device 10 is mounted in an inverted position on a pole 100 so that a path or road 110 is illuminated by the lighting units 56.

FIGS. 12-19 depict another preferred embodiment showing an illumination apparatus 298 that includes a pole mount clamp 300 (best shown in FIG. 19) and a light emitting assembly 360. As shown in FIG. 12, the pole mount clamp 300 is in a closed clamp position 301. In the closed position 301 the pole mount clamp 300 has an internal diameter (designated ID in FIG. 15) of about 4 (four) inches. The pole mount clamp 300 has a first clamp half 302 and a second clamp half 304. In one of the preferred embodiments the pole mount clamp 300 is made of plastic.

As best shown in FIG. 13, the first clamp half 302 has a first barrel members 306 and as shown there are two such first barrel members 306, and the second clamp half 302 has second barrel members 308, and there are three such second barrel members 308. The first barrel members 306 and the second barrel members 308 are intermeshed with one another and together define a pin opening 310. A hinge pin 312 is disposed in the pin opening 310 to hold the first and second barrel members 306, 308 together to form a hinge 315, so that the first and second clamp halves 302, 304 can be rotated relative to one another as indicated by the arrow designated Z in FIG. 13. In FIGS. 13 and 14 the pole mount clamp 300 is in an open clamp position 303. The first and second clamp halves 302, 304 and the hinge pin 312 are made of plastic on one of the preferred embodiments, but can be made of other materials, for example metals. It is pointed out that, as shown in FIG. 13, in one of the preferred embodiments the first clamp half 302 and the first barrel members 306 are formed as a one piece body 307, and the second clamp half 304 and the second barrel members are formed as a one piece body 309.

As shown in FIG. 13 the first clamp half 302 has a first clamping lug 314 with first lug openings 316, and the second clamp half 304 has a second clamping lug 318 with second lug openings 320. When the first and second clamp halves 302, 304 are in the closed clamp position 301 the first and second lug openings 316, 320 are aligned with one another and fasteners 322 (FIG. 15) are inserted therein to hold the first and second clamp halves 302, 304 in the closed clamp position 301. When the pole mount clamp 300 is in the closed clamped position 301 the pole mount clamp 300 defines a pole opening 305. The fasteners 322 can be repeatedly tightened and removed such that the first and second halves 302, 304 can be repeatedly moved from the closed clamp position 301 to the open clamp position 303. The fasteners 322 may comprise plastic or metal and are threaded in one of the preferred embodiments so as to be able to thread to internal threads, commonly designated 324, that surrounds one or both of the to an first and second lug openings 316, 320. It is pointed out that in one of the preferred embodiments the first clamp half 302 and the first clamping lug 314 are formed as a one-piece body 317, and the second clamp half 304 and the second clamping lug 318 are formed as a one-piece body 319.

As shown in FIG. 13, extending from the first clamp half 302 is a first light support 330, and extending from the second clamp half 304 are second and third light supports 332, 334. As best shown in FIGS. 14, 15 and 19 each of the first, second and third light supports 330, 332, 334 defines first, second and third clamp fastener openings designated 337a, 337b, and 337d, respectively, and each sized to receive a clamp fastener 339 that may be embodied as a screw. In one of the preferred embodiments the first clamp half 302 and the first light support 330 are formed as a one-piece body 331 and can be made of plastic, and similarly, the second clamp half 304 and the second and third light supports 332, 334 are formed as a one piece body 335 and can be made of plastic. The first, second and third light supports 330, 332, 334 define first, second and third light support recess 330a, 332a, 334a, respectively, each for receiving an arm insert 400 (shown in FIGS. 16, 17, 18 and 19). FIG. 16 shows an arm insert opening 403 defined in the arm insert 400 that can be aligned with the first clamp fastener opening 337a. The clamp fastener 339 is then moved through the first clamp fastener opening 337a and arm insert opening 403 and tightened to secure them together.

As shown in FIG. 13, the first clamp half 302 has a first clamp half internal surface 342, and the second clamp half 304 has a second clamp half internal surface 344, and each of the first and second clamp half internal surfaces 342, 344 is concave. As shown in FIGS. 15 and 15A, an insert 338 is provided that is made of plastic or from a rigid plastic or a rigid foam material and has a circular shape and resembles the shape of an O-ring. The insert 338 is disposed such that it abuts against the pole 100 and the first and second clamp half internal surfaces 342, 344 when the first and second clamp halves 302, 304 are in the closed clamp position 301. The insert 338 could be installed by moving it over an end of the pole 100 until it is at the desired location on the pole. The purpose of the insert 338 is to allow the pole mount clamp 300 to be adapted for use with poles 100, for example flagpoles 101, having different diameters. As shown in FIG. 15B the insert 338 is embodied as a split ring insert 338a having a slit 338b, such that the split ring insert 338a and can be readily fitted around the pole 100 at any desired location on the pole 100. The split ring insert 338A is disposed such that it abuts against the pole 100 and the first and second clamp half internal surfaces 342, 344 when the first and second clamp halves 302, 304 are in the closed clamp position 301. In one of the preferred embodiments an adhesive 346 (preferably a weatherproof adhesive and shown in FIG. 15) is applied to the one of the first or second internal surfaces 342, 344. The insert 338 (or the split ring insert 338a) is then moved into contact with the adhesive 346 and adhered to the pole mount clamp 300. The adhesive 346 could be applied such that is covers both the first and second internal surfaces 342, 344 so that the insert 338 is adhered to both the first and second clamp halves 302, 304, but it would need to be cut if the first and second halves 302, 304 needed to be unclamped.

The insert 338 thus allows the pole mount clamp 300 to be used with in connection with poles 100 having diameters of less than four inches, for example three inches, two and a half inches and two inches. Indeed, the insert 338 can be formed in various sizes such that the pole mount clamp 300 can accommodate virtually any pole 100 having a diameter of less than four inches. In other preferred embodiments the pole mount clamp 300 has an internal diameter greater than four inches.

As shown in FIGS. 16 and 17, there is the light emitting assembly 360 of the illumination apparatus 298. The light emitting assembly 360 is capable of being supported by the above-described pole mount clamp 300. The light emitting assembly 360 includes a solar panel 90a and a rechargeable battery pack 362 (FIG. 17). In one of the preferred embodiments the rechargeable battery pack 362 includes three 1,500 milliamp-hour batteries with an output voltage of about 5 (five volts). The battery pack 362 is disposed in a battery pack housing 363.

The light emitting assembly 360 also includes a light emitting diode component 366. A wire 85 connects the rechargeable battery pack 362 to the light emitting diode component 366, and the light emitting diode component 366 has eight (8) LED's 62. The number of LED's 62 may be varied.

As shown in FIGS. 16 and 17 a pair of panel lugs 368 extends from the battery pack housing 363. A light emitting diode lug 370 extends from the light emitting diode component 366, and the light emitting diode lug 379 is positioned between the pair of panel lugs 368. An adjustment bolt 372 extends through both the pair of panel lugs 368 and the light emitting diode lug 370, thus holding them together. The adjustment bolt 372 can be loosened and then tightened such that the solar panel 90a can be adjusted relative to the light emitting diode component 366 (as indicated by the arrow designed F-F in FIG. 17) and then fixed in any desired position by tightening the adjustment bolt 372.

The light emitting diode component 366 has an outer housing 378, and disposed internal to the outer housing 378 is a LED housing 380 that includes a lens 382, as shown in FIG. 16. The LED housing 380 is designed so as to be watertight. There is a gap space 384 defined between the LED housing 380 and the outer housing 378 such that water can drain around the LED housing 380 and out an outflow opening 386 (FIG. 17) defined in the outer housing 378.

As shown in FIG. 18 extending from the outer housing 378 of the light emitting diode component 366 is a housing arm 390. The housing arm 390 has a first toothed portion 392 having first teeth 394 that extend therefrom, and the first toothed portion 392 defines a bolt opening 396. The light emitting assembly 360 also includes the previously mentioned arm insert 400 that has a second toothed portion 402 having second teeth 404 that extend therefrom, and the second toothed portion 402 defines a bolt opening 406. The arm insert 400 also has an insertion portion 401 that meets with the second toothed portion 402. The first and second teeth 394 are 404 are sized such they are capable of meshing together when the first and second toothed portions 392, 402 are moved together and abut one another. A bolt 405 is threadable to a nut 407 disposed in the arm insert 400 and is for connecting the housing arm 390 and the arm insert 400 together. It is pointed out that prior to tightening the nut and bolt 407, 405 and prior to meshing the first and second teeth 394, 404 the housing arm 390 and the arm insert 400 are rotated or moved relative to one another (as indicated by the arrow G-G in FIG. 17) so the user can select a desired angle for the light emitting diode component 366. Once the angle is selected, the user meshes the first and second teeth 394, 404 and tightens the nut and bolt 407, 405 thus locking the position of the light emitting diode component 366 in place.

As shown in FIG. 19, the above described insertion portion 401 of the arm insert 400 is inserted into the first light support recess 330a defined in the first light support 330 and is held therein with, for example, a pressure or compression type fit. In addition, the user can use the previously described clamp fasteners 339 to connect the arm insert 400 and the first light support 330 for additional stability, for example in high wind situations. The arm insert 400 could also be connected to the first light support 330 with, for example, adhesives. In addition, the insertion portion 401 of the arm insert 400 is shown having a generally cylindrical shape.

In another preferred embodiment shown in FIGS. 16A and 16B the insertion portion 401 of the arm insert 400 is modified. In particular, the insertion portion 401 is replaced with a shaped insertion portion 420 having four ribs commonly designated 422 that are perpendicular to one another that meet and join with circular walls 424 that are circular shaped. The ribs 422 and circular walls 424 provide for a compressive/friction fit when the shaped insertion portion 420 is moved into, for example, the first light recess 330a of the first light support 330.

FIG. 19 is a side view of one of the illumination apparatus 298 wherein one of the light emitting assemblies 360 is supported by the first light support 330 of the pole mount clamp 300. It is to be understood that the second and third light supports 332, 334 can also support light emitting assemblies 360 in the manner described above. Due to the fact that the solar panel 90a can be moved as indicated by the arrow designate F-F, and the light emitting diode component 366 can be moved as indicated by arrow designated G-G the illumination apparatus 298 can be readily adjusted to accommodate virtually any lighting application and gather solar energy regardless of the season of the year.

In another preferred embodiment shown in FIGS. 20-21A there is a supported illumination device 499 wherein the above-described arm insert 400 (FIG. 18) is replaced with an arm mount 500 that is capable of being bolted, nailed or screwed directly to a surface, for example a wall, a floor 507, a post or a tree (not shown). Here, the pole mount claim 300 is not needed. The arm mount 500 has a base portion 502 that defines arm mount openings 504 for accommodating the screw, nail or bolt. Extending from the base portion 502 is an arm portion 506 that meets with an arm toothed portion 508 having arm teeth 510 that extend therefrom, and the arm toothed portion 508 has an arm bolt opening 512. The arm teeth 510 of the armed toothed portion 508 intermesh with the first teeth 394 of the first toothed portion 392 (shown in FIG. 18) in the manner described immediately above. Thus, the arm mount 500 expands the scope of use of the invention to flat surfaces.

In another preferred embodiment there is a spike supported illumination device 599 shown in FIGS. 22-24 there is a ground spike 600 having a spike portion 602. The spike portion 602 has four spike flanges commonly designated 604 that are each tapered to and terminate at a spike tip 606. In addition, extending from the ground spike 602 is a spike insertion portion 608 having four spike ribs commonly designated 610 that are perpendicular to one another that meet and join with circular spike walls 612. The spike portion 602 is capable of being driven into the ground.

As shown in FIGS. 25 and 26 there is an extension member 620, and the extension member 620 is hollow and defines and extension member opening 622 and has an exterior surface 624. The exterior surface 624 may have longitudinal corrugations 626 in one of the preferred embodiments. As shown in FIG. 26A, the extension member 620 has an internal diameter and the spike insertion portion 608 is capable of fitting in a first extension member end 621 in a close fitting friction fit or compression type fit. In addition, the extension member 620 also has an opposed second extension member end 623 that is capable of receiving the above-described insertion portion 401 (FIG. 18) of the arm insert 400 therein in a close fitting relationship friction fit or compression type fit. Thus, the extension member 620 elevates the light emitting assembly 360 above the surrounding ground 99.

To elevate the light emitting assembly 360 even higher a connector member 670 is provided and is shown in FIGS. 27-29. The connector member 670 has first and second connector ribs 672, 674 that meet at right angles relative to one another, and a spacing disk 674 is disposed in the first and second connector ribs 672, 674 such that they extend in opposite directions from the spacing disk 674. The spacing disk 674 also extends beyond the edges of the first and second connector ribs 672, 674. The connector member 670 is capable of making a close fitting friction/compression type fit with the extension members 620, and the spacing disk 674 prevents the connector member 670 from entering the interior of the extension member 620. As is readily apparent, any desired number of the extension members 620 can be connected in this manner by adding more connector members 670 and extension members 620 as shown in FIG. 29, to thus provide for virtually any spacing of the light emitting assembly 360 from the ground spike 602.

The use of the above-described extension member 620 and connector member 670 is not limited solely to use in connection with the ground spike 602. In particular, as shown in FIG. 19 the light emitting assembly 360 is supported directly by the first light support 330 of the pole mount clamp 300. The distance from the light emitting assembly 360 to the pole mount clamp 330 can be increased by the use of the extension members 620 and connector members 670. For example, in FIG. 30 there are a plurality of connector members 670 and extension members 620 (prior to being inserted into one another). Thus, the distance of the light emitting assembly 360 from the pole 100 can be increased by the use of connector members 670 and extension members 620, and this fills the needs of users having different lighting requirements.

In addition, the illumination apparatus 298, the supported illumination device 499, and the spike supported illumination device 599 can be sold as kits.

In another preferred embodiment shown in FIGS. 31-49, there is a band illumination device 700. As shown in FIG. 32, the band illumination device 700 includes a clamp assembly 702 that includes at least one screw band clamp 704 with two screw band clamps 704 shown in FIG. 31. The screw band clamp 704 has a band 706 that defines screw openings 708 that are spaced apart from one another. A first end 710 of the screw band clamp 704 has a screw holder 705 that is joined to a captive screw 712 that can be rotated to tighten and loosen the screw band clamp 704 when the captive screw 712 engages the clamp edges 714 that define the screw openings 708.

As shown in FIGS. 34-37, the clamp assembly 702 further includes a pole-engagement component 714. The pole-engagement component 714 has base wall 715 with first and second contact walls 716, 718 extending from the base wall 715. The base wall 715 defines base wall openings commonly designated 717. The first and second contact walls 716, 718 flare outwardly from the base wall 715 in one of the preferred embodiments. There are also first contact wall openings 720 defined in the first contact wall 716 and second contact wall openings 722 defined in the second contact wall 718. The first and second contact wall openings 720, 722 are sized to accommodate the bands 706, such that one band 706 can be passed through one of the first contact wall openings 720 and one of the second contact wall openings 722, and the another band 706 can be passed through the one of the first contact wall openings 720 and one of the second contact wall openings 722. The bands 706 surround the pole 100 and can be tightened or loosened by rotating the captive screws 712.

As shown in FIGS. 31 and 38-40 the band illumination device 700 includes a pole engagement mount 730 having a pole engagement base plate 731 that defines base plate openings commonly designated 733. The pole engagement base plate 731 abuts against and is joined to the base wall 715 of the pole-engagement component 714 with fasteners 732, for example, screws or nuts and bolts, that extend through the base plate openings 733 and the base wall openings 717. Two base plate openings 733 and two base wall openings 717 are shown in the figures, but in other preferred embodiments there can be more than two base plate openings 733 and two base wall openings 717. The pole engagement mount 730 also has a pole engagement mount arm 734 that extends from and is joined to the pole engagement base plate 731. The pole engagement mount arm 734 and the pole engagement base plate 731 may be formed as a one-piece body. The pole engagement mount arm 734 has a toothed mount arm portion 736 having mount arm teeth 737 and that defines a pole engagement mount arm opening 738. As shown in FIG. 40, the pole engagement mount arm opening 738 is defined in part by internal walls 740 that form a hexagonal shape such that a nut 742 can be disposed therein (as indicated by the dashed arrow in FIG. 40).

As shown in FIGS. 31, 41 and 42, the band illumination device 700 also includes a branched support member 744 that has a generally Y-shape and has opposed first and second branch sides 745, 747. The branched support member 744 has a central portion 745 from which extend first, second and third branches 746, 748, 750. Although the second branch 748 is shown to have a curved shape, it is to be understood that in other preferred embodiments the second branch 748 is straight and has no curvature. The first branch 746 has a first branch distal end 750 having a first branch engagement head 752 with first engagement head teeth 754 (best shown in the top view of FIG. 41). Similarly, the second branch 748 has a second branch distal end 756 with a second branch engagement head 758 with second engagement head teeth 759 (best shown in FIG. 41). The third branch 750 has third branch distal end 760 having a third branch attachment portion 762. In addition, the first branch engagement head 752 defines a first branch engagement head opening 764, and the second branch engagement head 758 defines a second branch engagement head opening 766, and the third branch attachment portion 762 defines a third branch attachment portion opening 768. FIG. 42 shows a bottom view of the branched support member 744, and FIG. 43 shows a perspective view of the branched support member 744.

The band illumination device 700 also includes a clamped lighting assembly 780 as shown in FIGS. 44A, 44B and 45 and it connects to the second branch engagement head 758 (FIG. 41). In particular, as shown in FIG. 44A the clamped lighting assembly 780 has a lighting assembly extension member 782 having a lighting assembly engagement head 784 with a lighting assembly engagement head toothed portion 786 and having lighting assembly engagement head teeth 788. The lighting assembly engagement head 784 defines a lighting assembly engagement head opening 790. The lighting assembly engagement head teeth 788 intermesh with the second engagement head teeth 759 (see FIG. 41) of the second branch 748 and locked in place with an engagement head bolt 761 that extends through the second branch engagement head opening 766 and the lighting assembly engagement head opening 790 (as shown in FIG. 31). It is pointed out that the lighting assembly engagement head 784 and the second branch engagement head 758 can be adjusted relative to one another prior to tightening an engagement head nut 763 (FIG. 43) on the engagement head bolt 761.

The clamped lighting assembly 780 also includes a housing portion 792 and a cover portion 794 and the housing portion 792 is joined with the lighting assembly extension member 782. The housing portion 792 defines a housing portion recess 793. Extending from a first housing portion edge 795 (FIG. 44B) is a clamping lug 796 that defines a clamping lug opening 798. Extending from the housing portion 792 in a direction opposite the clamping lug 796 is a first plate extension 800 and a second plate extension 804. A plurality of LED's 62 with associated circuitry (with twelve being shown in FIG. 44A) are disposed in the housing portion recess 793. It is pointed out that the number of LED's can be more or less than twelve in other preferred embodiments.

The cover portion 794 of the clamped lighting assembly 780 further includes a plate frame 812 that surrounds a generally rectangular shaped transparent plate 810, for example a clear plastic plate. The plate frame 812 includes a frame lug 814 that defines a frame lug opening 816. A frame fastener 813, for example a nut and bolt, is received in the frame lug opening 816 and the clamping lug opening 798. The cover portion 794 also includes a first abutment lug 818 having a first abutment lug end 824, and a second abutment lug 820 having a second abutment end 822. The first and second abutment ends 824, 822 abut against the first and second plates 800, 804, such that when the clamping lug 796 and frame lug 814 are clamped together the cover portion 794 cannot be moved. Thus, the cover portion is removeably attached to the housing portion 792. A power cord 826 extends through the housing portion 792 and provides power to the LED's 62.

As shown in FIGS. 46-49 the band illumination device 700 also includes a solar panel assembly 830 that is connected to the attachment portion 762 of the third branch 750. In particular, the solar panel assembly 830 has a pair of facing first and second assembly arms 832a, 832b that define first and second assembly arm openings 834a, 834b respectively. The pair of first and second assembly arms 832a, 832b extend from a battery housing 836 containing rechargeable batteries 840 (shown in dashed lines in FIG. 47). The solar panel assembly 830 also has a solar array 842 having, for example, eight solar panels 844 that are wired to the rechargeable batteries 840 so as be able to deliver electric charge to the rechargeable batteries 840. An array frame 843 surrounds the solar array 842. The battery housing 836 also defines a power button opening 846, and a power button extends 848 through the power button opening 846. The battery housing 836 is connected to the array frame 843 with array bolts 850 that extend through battery housing extensions 852 and into the array frame 843 (FIG. 49. Extending from a location internal to the battery housing 836 to a location external to the battery housing is the power cord 826. The power cord 826 delivers power from the rechargeable batteries 840 to the LED's 62 disposed in the housing portion 792. The power button extends 848 can be manually depressed to cause the LED's 62 to emit light or stop the LED's 62 from emitting light. The third branch attachment portion 762 is fitted between the first and second assembly arms 832a, 832b and a solar panel bolt 835 is extended through the third branch attachment portion opening 768 and the first and second assembly arm openings 834a, 834b and secured in place with the solar panel nut 835a. Alternatively, one of the first and second assembly arm openings 834a, 834b is be surrounded by an internal thread indicated by reference number 837 in FIG. 46. The solar panel bolt 835 can be threaded to the internal thread 837 such that upon tightening the solar panel bolt 835 the first assembly arm is 832a is drawn to the second assembly arm 832b. In either embodiment the third branch 750 is connect to the solar panel assembly 830. It is pointed out that the solar panel assembly 830 can be rotated relative to the third branch 750 to virtually any position for maximum sun exposure before the solar panel bolt 835 is tightened thus fixing their relative positions in place.

The first engagement head teeth 754 of the first branch 746 (FIG. 41) are meshed with the mount arm teeth 737 (FIG. 39) of the toothed mount arm portion 736. A mount arm bolt 741 is passed through the pole engagement mount arm opening 738 and the first branch engagement head opening 764 and a mount arm nut 742 is threaded to the mount arm bolt 741. It is pointed out that the branched support member 744 can be rotated relative to the pole engagement mount arm 734 to virtually any position prior to tightening the mount arm nut 742.

As shown in FIG. 50, in another preferred embodiment there is an adjustable band illumination assembly 900 installed on a pole 100. The adjustable band illumination assembly 900 includes first and second clamp assemblies 702a, 702b that are structurally identical to the clamp assembly 702 described above, and a first pole engagement mount 730a is joined to the first clamp assembly 702a, and a second pole engagement mount 730b is joined to the second clamp assembly 702b, and the first and second pole engagement mounts 730a, 730b are structurally identical to the above-described pole engagement mount 730 (shown in FIGS. 38-40). The first and second clamp assemblies 702a, 702b are fixed to the pole 100 in the manner previously described and are spaced a clamping distance designated CD apart from one another. The clamping distance designated CD can be any desired distance as required by the user, for example twelve inches, forty inches, seventy inches or more or less than these distances.

The adjustable band illumination assembly 900 also includes a light arm component 902 (FIG. 51) and a solar arm component 930 (FIG. 54). Turning now to FIGS. 51-53, the light arm component 902 has a first light arm end 904 with a toothed light arm portion 906 having light arm teeth 908. The toothed light arm portion 906 defines a toothed light arm opening 910. The light arm teeth 908 are capable of meshing with mount arm teeth 737a of the first pole engagement mount 730a, such that the light arm component 902 can be adjusted relative to a first clamp assembly 702a. Once the desired adjustment is achieved the light arm teeth 908 are intermeshed with the mount arm teeth 737a and secured in place with a light arm bolt 911 that extends through the toothed light arm opening 910 and a pole engagement mount arm opening 738a, and a light arm nut 913 is threaded and tightened to the light arm bolt 911.

The light arm component 902 also has a second light arm end 912 that has a connecting portion 914 that defines a connecting portion opening 916. There is provided a clamped lighting assembly 780 the same as previously described, but wherein the lighting assembly engagement head 784 is replaced with first and second lighting assembly lugs 918a, 918b that define first and second lighting assembly lug openings 920a, 920b, respectively. The connecting portion opening 916 opening is aligned with and disposed between the first and second lighting assembly lugs 918a, 918b such that the first and second lighting assembly lug openings 920a, 920b are aligned with the connecting portion opening 916. A lighting fastener 922 is disposed in the connecting portion opening 916 and the first and second lighting lug openings 920a, 920b such that the clamped lighting assembly 780 can be adjusted relative to the light arm component 902 and secured in place by tightening the lighting fastener 922.

As shown in FIGS. 54-56 there is a solar arm component 930 having a first solar arm end 934 with a toothed solar arm portion 936 from which extend solar arm teeth 938. The toothed solar arm portion 936 defines a toothed solar arm opening 940. The solar arm teeth 938 mesh with the mount arm teeth 737b of the second pole engagement mount 730b, such that the solar arm component 930 can be adjusted relative to the second clamp assembly 702b. Once the desired adjustment is achieved the solar arm teeth 938 are intermeshed with the mount arm teeth 737b and secured in place with a bolt 931 that extends through the toothed solar arm opening 910 and the pole engagement mount arm opening 738b and a solar panel nut 933.

The solar arm component 930 also has a second light arm end 940 that has a solar arm engagement portion 942 that defines a solar arm engagement portion opening 944. The solar arm engagement portion 942 has solar arm engagement teeth 947. A solar panel unit 945 having a solar panel assembly 946 is provided. The solar panel unit 945 also has a solar panel engagement head 948 with solar panel engagement head teeth 950. A solar panel engagement head opening 952 is defined in the solar panel engagement head 948. The solar panel unit 945 also contains a rechargeable battery pack 956. The solar arm engagement teeth 947 mesh with the solar panel engagement head teeth 950 and are held together with a solar panel engagement head bolt 953 that extends through the solar arm engagement portion opening 944 and solar panel engagement head opening 952, and are adjusted relative to one another before tightening the solar panel engagement head bolt 953 to a solar panel engagement head nut 957. Thus, the solar panel unit 945 is adjustable relative to the solar arm component 930. A power cord 826 connects the solar panel unit 945 to the clamped lighting assembly 780.

In another preferred embodiment shown in FIGS. 57 and 58 there is a spike illumination assembly 990 that includes ground spikes 600. In particular, a ground spike is provided for supporting each of the solar panel unit 945 (shown in FIGS. 55 and 56) and the clamped lighting assembly 780 (FIGS. 52 and 53) above the ground 99.

As shown in FIG. 57, there is a ground spike 600 and there is at least one extension member 620 as previously described, and the spike insertion portion 608 is fit in the first extension member end 621 as previously described. The extension member 620 also has an opposed second extension member end 623. As shown in FIG. 57 there is a connector member 670 having first and second connector ribs 672, 674. There is a spacing disc 674a and the spacing disc 674a is substantially flush with the edges of the first and second connector ribs 672, 674. In this embodiment the connector member 670 also has a connector mount plate 675 with connector plate openings 677. One of the previously described pole engagement mounts 730 (FIG. 38) is provided having a pole engagement base plate 731 that defines base plate openings commonly designated 733. In this embodiment the base plate 731 has a circular shape. The pole engagement mount arm 734 has a toothed mount arm portion 736 having mount arm teeth 737 and defines a pole engagement mount arm opening 738 as previously described. Connector member fasteners 679 extend through the connector plate openings 677 and the base plate openings 733 thus securing the connector member 670 and the pole engagement mount 730. Reference is made to the solar panel unit 945 (FIGS. 55 and 56). The previously described solar panel engagement head teeth 950 of the solar panel engagement head 948 (shown in FIG. 56) are meshed with the mount arm teeth 737 and the two are held together with one of the previously described mount arm bolts 741. After assembly, the ground spike 600 is moved into the ground 99 and the solar panel unit 945 is elevated above the ground 99.

The spike illumination assembly 990 includes another ground spike 600. As shown in FIG. 58, there is another ground spike 600 that same as previously described, and there is at least one extension member 620 as previously described, and the spike insertion portion 608 is fit in the first extension member end 621 as previously described. The extension member 620 also has an opposed second extension member end 623. Fitted in the second extension member end 623 is a light support connector member 671. In particular, the light support connector member 671 has first and second connector ribs 672, 674 that extend from a first side 677 of a support wall member 681, and a light support connector portion 683 extends from a second side 685 of the support wall 681. The first and second ribs 672, 674 are fitted in the second extension member end 623. The light support connector portion 683 defines a light support connector opening 673. The light support connector 671 is connected to the clamped lighting assembly 780 of FIG. 53 by inserting the light support connector portion 683 between the first and second lighting assembly lugs 918a, 918b (shown in FIG. 52). Then, one of the lighting fasteners 922 is inserted in the first and second lighting lug openings 920a, 920b and the light support connector opening 673, and it is fixed in place after the clamped lighting assembly 780 has been adjusted. After assembly, the ground spike 600 is moved into the ground 99 and the clamped lighting assembly 780 is elevated above the ground 99. A power cord 826 connects the solar panel unit 945 and clamped lighting assembly 780 that are supported by the ground spikes 600.

It will be appreciated by those skilled in the art that while the illumination device 10, the illumination apparatus 298, the supported illumination device 499, the spike supported illumination device 599, the band illumination device 700, the adjustable band illumination assembly 900, and the spike illumination assembly 590 have been described in detail herein, the invention is not necessarily so limited and other examples, embodiments, uses, modifications, and departures from the embodiments, examples, uses, and modifications may be made without departing from the illumination device 10, the illumination apparatus 298, the supported illumination device 499, the spike supported illumination device 599, the band illumination device 700, the adjustable band illumination assembly 900, and the spike illumination assembly 990 and all such embodiments are intended to be within the scope and spirit of the appended claims.

What is claimed:
1. A band illumination device comprising:
a clamp assembly that includes at least one screw band clamp having at least one band;
the clamp assembly further includes a pole-engagement component having a base wall from which extend first and second contact walls and wherein the first contact wall defines at least one first contact wall opening and the second contact wall defines at least one second contact wall opening and wherein the band extends through the at least one first contact wall opening and the at least one second contact wall opening;
a pole engagement mount having a pole engagement base plate and a pole engagement mount arm that extends from the pole engagement base plate and the pole engagement base plate is connected to the base wall of the pole engagement component, and wherein the pole engagement mount arm has a toothed mount arm portion having mount arm teeth and that defines a pole engagement mount arm opening;
a branched support member having a central portion from which extend a first branch, a second branch and a third branch and wherein the first branch has a first branch distal end having a first branch engagement head that defines a first branch engagement head opening and having first engagement head teeth that are meshed with the mount arm teeth and wherein the first branch engagement head is connected to the toothed mount arm portion with a mount arm bolt that extends through the pole engagement mount arm opening and the first branch engagement head opening such that the branched support member can be adjusted relative to the pole engagement mount arm prior to tightening a mount arm nut on the mount arm bolt;
wherein the second branch has a second branch distal end with a second branch engagement head with second engagement head teeth and that defines a second branch engagement head opening, and the third branch has a third branch distal end having a third branch attachment portion that defines a third branch attachment portion opening;
a clamped lighting assembly having a lighting assembly extension member with a lighting assembly engagement head having a lighting assembly engagement head toothed portion with lighting assembly engagement head teeth and wherein the lighting assembly engagement head teeth mesh with the second engagement head teeth and the lighting assembly engagement head is connected to the second branch engagement head; and,
the clamped lighting assembly further includes a housing portion that defines a housing portion recess and a cover portion and the lighting assembly extension member is joined to the housing portion, and wherein the housing portion has a clamping lug that defines a clamping lug opening and first and second plate extensions extend from the housing portion in a direction opposite the clamping lug.
2. The band illumination device according to claim 1 wherein the clamped lighting assembly is adjusted relative to the second branch prior to connecting the clamped lighting assembly to the second branch.

3. The band illumination device according to claim 1 further including a plurality of light emitting diodes are disposed in the housing portion recess.

4. The band illumination device according to claim 1 wherein the cover portion of the clamped lighting assembly further includes a plate frame and a transparent plate surrounded by the plate frame, and wherein the plate frame includes a frame lug that defines a frame lug opening such that a frame fastener is capable of being received in the frame lug opening and the clamping lug opening to secure the plate frame to the housing portion.

5. The band illumination device according to claim 1 further including a solar panel assembly and wherein the attachment portion of the third branch is connected to the solar panel assembly.

6. The band illumination device according to claim 5 wherein the solar panel assembly has a pair of facing first and second assembly arms that extend from a battery housing and define first and second assembly arm openings and the solar panel assembly has a solar array that includes at least one solar panel that is wired to rechargeable batteries disposed in the battery housing.

7. The band illumination device according to claim 6 wherein the third branch attachment portion is fitted between the first and second assembly arms, a solar panel bolt extending through the third branch attachment portion opening and the first and second assembly arm openings and secured in place with a solar panel nut such that the solar panel assembly can be adjusted relative to the attachment portion of the third branch prior to tightening the solar panel nut.

8. The band illumination device according to claim 6 further including a power cord that connects to the rechargeable batteries and extends to light emitting diodes to power the light emitting diodes.

9. The band illumination device according to claim 1 further including a pole and wherein the at least one band of the clamp assembly surrounds and is tightened such that the clamp assembly is fixedly supported by the pole thus supporting the branched support member and wherein the branched support member has a Y-shape.

* * * * *